United States Patent [19]

Yamada et al.

[11] Patent Number: 5,024,927
[45] Date of Patent: Jun. 18, 1991

[54] INFORMATION RECORDING MEDIUM

[75] Inventors: Katsuyuki Yamada, Yokohama; Yukio Ide, Mishima; Makoto Harigaya, Hiratsuka; Hiroko Iwasaki, Tokyo, all of Japan

[73] Assignee: Ricoh Company, Ltd., Tokyo, Japan

[21] Appl. No.: 417,541

[22] Filed: Oct. 4, 1989

[30] Foreign Application Priority Data

| Oct. 6, 1988 | [JP] | Japan | 63-252764 |
| Nov. 18, 1988 | [JP] | Japan | 63-290177 |
| Mar. 10, 1989 | [JP] | Japan | 1-056188 |
| Mar. 29, 1989 | [JP] | Japan | 1-074973 |
| Mar. 29, 1989 | [JP] | Japan | 1-077838 |
| May 16, 1989 | [JP] | Japan | 1-122039 |
| Aug. 28, 1989 | [JP] | Japan | 1-218650 |

[51] Int. Cl.⁵ ............................ G03C 1/00; G11B 7/24
[52] U.S. Cl. ..................... 430/495; 430/19; 430/290; 430/346; 430/945; 430/270; 346/135.1; 369/100
[58] Field of Search ............. 430/19, 270, 290, 346, 430/495, 945; 346/135.1; 369/100

[56] References Cited

U.S. PATENT DOCUMENTS

| 4,584,258 | 4/1986 | Detty et al. | 430/270 |
| 4,650,737 | 3/1987 | Wiedemann | 430/59 |
| 4,819,210 | 4/1989 | Miura et al. | 365/106 |
| 4,860,273 | 8/1989 | Sawano et al. | 369/100 |

Primary Examiner—Charles L. Bowers, Jr.
Assistant Examiner—Ashley I. Pezzner
Attorney, Agent, or Firm—Cooper & Dunham

[57] ABSTRACT

An information recording medium comprising a substrate, and a recording layer formed thereon which comprises (a) a carbon-based material and (b) an optically reversible material whose optical characteristics can be reversibly changed, with the thermal decomposition temperature of the carbon-based material being higher than the melting point of the optically reversible material.

3 Claims, 9 Drawing Sheets

FIG. I
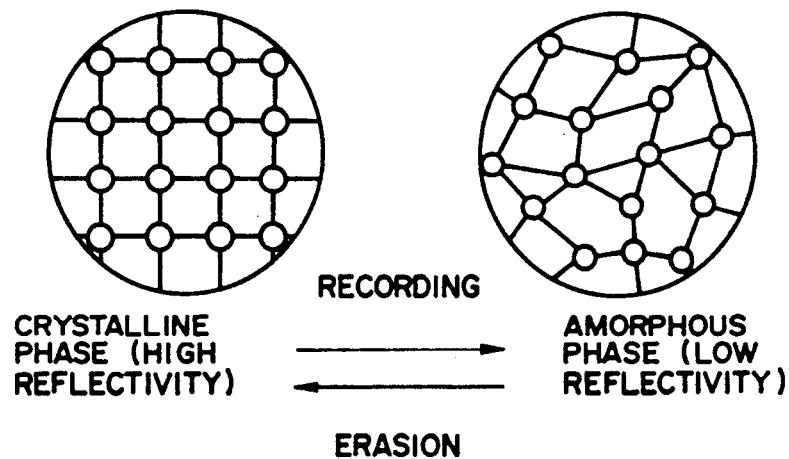
FIG. 2
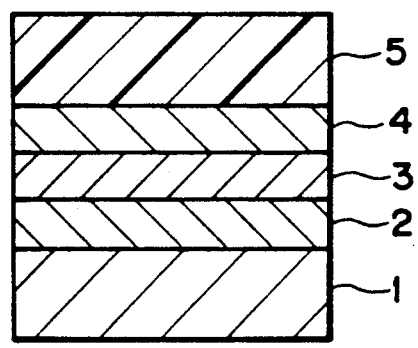

INFORMATION RECORDING MEDIUM

BACKGROUND OF THE INVENTION

1. Field of the Invention

This invention relates to a rewritable-type information recording medium applicable to an optical memory element, an optical disk and a filing system for documents.

2. Discussion of Background

Rewritable-type information recording media enable the user to erase unnecessary information and write new information as many times as desired by applying electromagnetic waves.

Conventionally known recording media of this type are as follows: A rewritable-type information recording medium which has a recording layer made of an amorphous film of a rare earth metal and a transition metal, and utilizes the magneto-optical effect, as reported by Shin Uchiyama in "Surface Chemistry", Vol. 8, page 2 (1987), and a rewritable-type information recording medium which has a recording layer made of a thin film of a chalcogen alloy, and utilizes a change between a crystalline phase and an amorphous phase, as reported by Masatoshi Takao in "Electro-Ceramics", November, page 16 (1987).

It is however difficult to overwrite on the former recording medium by applying a single beam thereto. Moreover, it requires an extremely complicated optical system on the driving side, so that the total cost becomes high.

On the phase-change-type information recording medium, information can be overwritten by applying a single beam. Moreover, the recording medium of this type does not require a complicated optical system on the driving side. For these reasons, research and development of such a recording medium is extensively being made nowadays.

Thin films of Ge-Te, Ge-Te-Sb, Ge-Te-S, Ge-Se-S, Ge-Se-Sb, Ge-As-Se, In-Te, Se-Te and Se-As, disclosed in U.S. Pat. No. 3,530,441, are known as typical chalcogen alloy thin films usable as the recording layer of the phase-change-type information recording medium.

In addition, aiming at improving the stability and achieving high-speed crystallization, the following proposals have been made so far. Namely, a Ge-Te alloy thin film incorporated with Au, as disclosed in Japanese Laid-Open Patent Application 61-219692, a Ge-Te alloy thin film incorporated with both Sn and Au, as disclosed in Japanese Laid-Open Patent Application 61-270190, and a Ge-Te alloy thin film incorporated with Pb, as disclosed in Japanese Laid-Open Patent Application 62-19490.

In order to obtain an improved recording medium which can endure repeated information recording and erasing, a material composed of Ge, Te, Se and Sb with a specific composition ratio has also been proposed in Japanese Laid-Open Patent Application 62-73438.

None of the above recording media, however, have all the characteristics required for a phase-change-type information recording medium. The remaining problems to be solved are improvement of the recording and erasing sensitivities, prevention of lowering of the erasion ratio, which is caused due to incomplete erasion at the time of overwriting, and prolongation of the expected life span of a non-recorded area.

In order to prevent the lowering of the erasion ratio, an information recording medium has been proposed, in which a phase changeable material is dispersed in a light-transmittable matrix. Agglomeration of crystals of the phase changeable material, which causes the lowering the erasion ratio, can thus be successfully prevented.

As the light-transmittable matrix, silicon oxide, aluminum oxide, titanium oxide and magnesium oxide are proposed in Japanese Laid-Open Patent Application 57-208648. Furthermore, Japanese Laid-Open Patent Application 63-173240 discloses, as the matrix metal oxides, metal nitrides, metal sulfides and metal carbides having low thermal conductivity, such as $SiO_2$, SiO, $Si_3N_4$, $TiO_2$, ZnS, ZnO, $Al_2O_3$, AlN, MgO, GeO, SiC, ZrO and $Nb_2O_5$.

In the case where any one of the above-mentioned inorganic material is employed as the matrix, crystal nuclei are formed and grow when information is repeatedly recorded and erased. As a result, the recorded information cannot be erased completely, and the C/N ratio is lowered due to a granular noise.

Organic materials can also be used as the matrix, as disclosed in Japanese Laid-Open Patent Applications 60-124038, 63-205832 and 63-206921. According to these patent applications, information recording media are prepared b simultaneous sputtering of Te and a heat-resistant resin. In addition, an information recording medium prepared by reactive sputtering of Te in $CH_4$ is reported in Technical Report CPM83-58 in the Institute of Electronics and Communication Engineers.

It is, however, extremely difficult to control the particle size and the dispersing state of Te when the above methods are employed. Moreover, when the organic matrix is prepared by an electric discharge, a reaction pressure is adjusted to approximately $10^{-2}$ Torr. Under such a pressure, coagulation of the dispersed material particles of Te is inevitable. It is therefore quite difficult to obtain a recording layer made of the organic matrix in which finely-divided particles of Te are dispersed.

An attempt has also been made to employ as the matrix a film prepared by plasma polymerization. In general, however, a plasma-polymerized film tends to contain a component which vaporizes at a temperature of 300° C. or less. Therefore, such a film is suitable for an overwritable-type recording medium, but unsuitable for a rewritable-type recording medium.

A recording layer of an information recording medium is readily deteriorated by moisture and oxygen contained in the air, and light. For this reason, one or both surfaces of the recording layer are generally provided with a protective layer. In addition, when information is recorded in the phase-change-type optical recording medium, the recording layer is melt due to heat applied thereto. It is therefore preferable to provide a protective layer to the recording layer.

The protective layer may be prepared by a metal oxide, a metal nitride, a metal sulfide or a metal carbide, such as $SiO_2$, $Si_3N_4$, ZnS, AlN, SiC or $ZrO_2$. A mixture of ZnS and $SiO_x$ in which x is 1 to 1.8 can also be used for the protective layer as disclosed in Japanese Laid-Open Patent Application 63-276724.

However, when any one of the above metallic compounds is employed as the protective layer, crystal nuclei are formed and grow when information is recorded and erased repeatedly. As a result, the recorded information cannot be erased completely, and the C/N ratio is also lowered due to a granular noise.

Furthermore, in the case where a recording layer made of a chalcogen film containing Te is employed in combination with the protective layer made of the above metallic compound, these two layers tend to react with each other to yield a metallic chalcogen compound. For this reason, the C/N ratio is lowered and the expected life span of the recording medium is also shortened.

Recently, an information recording medium having a heat-radiating layer has been proposed. Such a recording medium can be used for high-speed information recording and erasing.

Either a thin film, as disclosed in Japanese Laid-Open Patent Application 63-244423, prepared by dispersing metal powder of Al, Au or Cu having a particle size of 100 to 200 Å in a dielectric substance such as $SiO_2$, $TiO_2$, Si $Ta_2O_5$ or ZnS, or a metallic thin film, as reported in "1962 Autumn Symposium—Japanese Journal of Applied Physics", 18p, 2p, 12, page 736, which can also serve as a reflective layer, is used as the heat-radiating layer.

The above-described metals and metallic compounds tend to yield crystal nuclei to grow when information recording and erasing are repeated. As a result, the recorded information cannot be erased completely, and the C/N ratio is also lowered due to a granular noise.

Moreover, the heat-radiating layer is used together with a recording layer made of a chalcogen containing Te, these two layers react with each other to yield a metallic chalcogen compound. Thus, the C/N ratio is lowered, and the the expected life span of the recording medium is shortened.

In general, when the thermal conductivity of the heat-radiating layer is too low, the quenching effect cannot be obtained. On the contrary, the thermal conductivity is too high, heat cannot be effectively utilized, resulting in lowering the recording and erasing sensitivities. It is therefore necessary to control the thermal conductivity of the heat-radiating layer adequately to the recording layer. It is however quite hard to control the thermal conductivity of the above-described materials usable for the heat-radiation layer.

SUMMARY OF THE INVENTION

Accordingly, it is an object of the present invention to provide a rewritable-type information recording medium which can eliminate all the aforementioned shortcomings inherent in the prior art, and more particularly, to provide a rewritable-type information recording medium which has the high recording sensitivity and the high erasion ratio, is capable of recording and erasing information at high speed, is free from lowering of the C/N ratio after repeated information recording and erasing, has the prolonged expected life span, and requires no complicated system.

The above object of the present invention can be achieved by an information recording medium comprising a substrate, and a recording layer formed thereon which comprises (a) a carbon-based material and (b) a material whose optical characteristics can be reversibly changed (hereinafter referred to as an optically reversible material), with the thermal decomposition temperature of the carbon-based material being higher than the melting point of the optically reversible material.

In the above information recording medium, the carbon-based material serves as the matrix for the optically reversible material in the recording layer, and the optical characteristics of the optically reversible material can be reversibly changed by application of electromagnetic waves.

More specifically, the optically reversible material have the structures of two or more types which are reversibly transformed from one another depending on the power or the wavelength of the applied electromagnetic waves. The material of each structure has its own optical characteristics, such as reflectivity, absorption, transmittance and refractive index.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an illustration showing a crystalline phase and an amorphous phase of a recording layer for a phase-change-type information recording medium;

FIG. 2 is a cross-sectional view of one embodiment of the rewritable-information recording media according to the present invention;

DETAILED DESCRIPTION OF THE PREFERRED EMBODIMENTS

Figure 3:
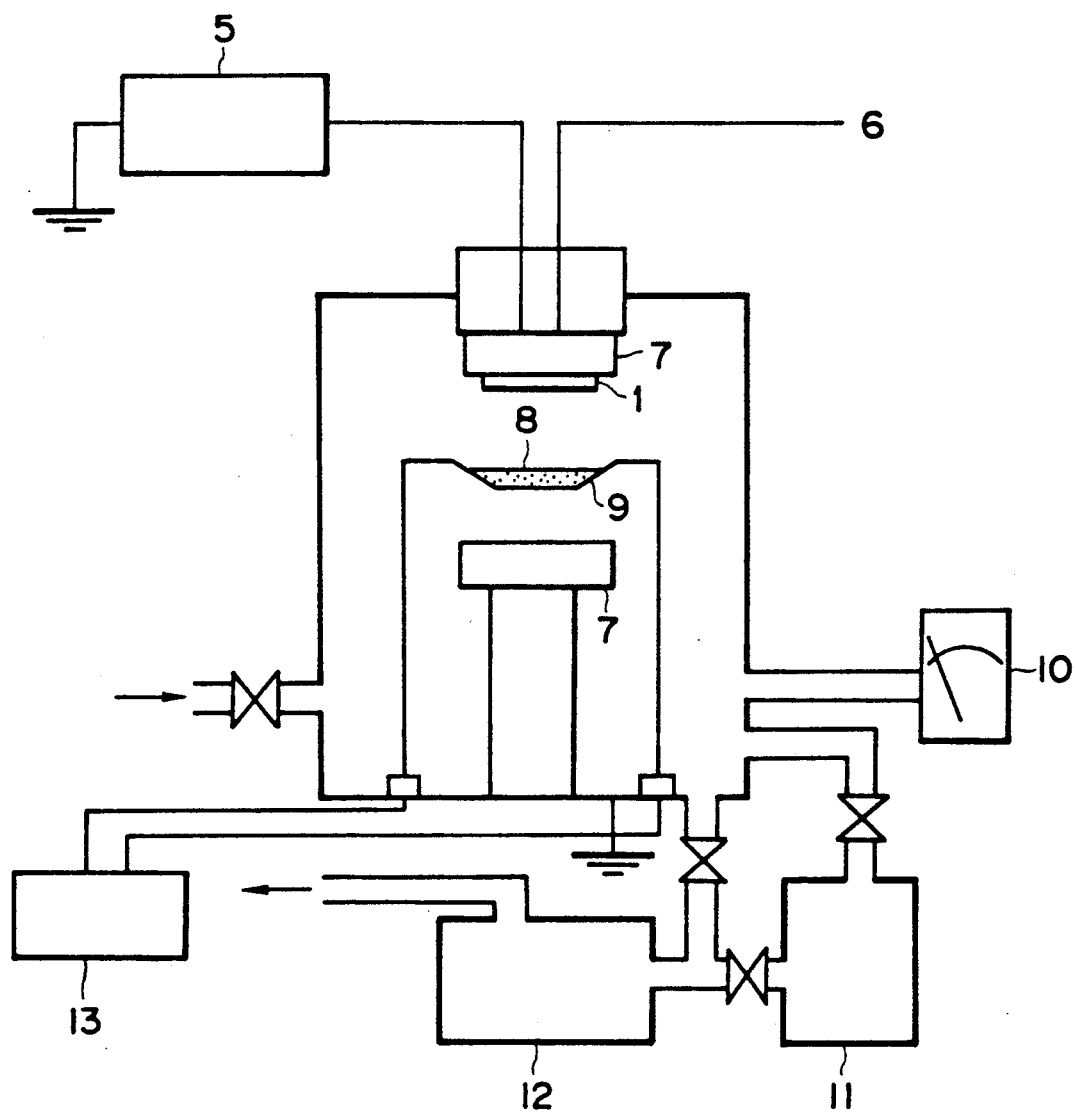
FIG. 3 is a diagram of an apparatus for plasma chemical vapor deposition (hereinafter referred to as "plasma CVD") used in Examples 1-1 and 1-2 which will be described later in this specification.

As mentioned previously, the information recording medium according to the present invention comprises a substrate, and a recording layer formed thereon which comprises (a) a carbon-based material and (b) an optically reversible material with the thermal decomposition temperature of the carbon-based material being higher than the melting point of the optically reversible material.

The mechanism of information recording and erasing in the information recording medium according to the present invention will be explained below with reference to an example in which laser beams are employed as the electromagnetic waves.

In general, as shown in FIG. 1, when information is recorded in a recording layer, an optically reversible material contained in the recording layer, which is initially in a crystalline phase, is changed to an amorphous phase. By such a change in the phase, the reflectivity of the recording layer is lowered.

In contrast, when the recorded information is erased, the optically reversible material in the amorphous phase is turned to the crystalline phase. The reflectivity of the recording layer is thus recovered to the initial value.

The reflectivity is converted into an electric voltage, so that it can be detected as an electric signal.

When information is recorded, a laser beam applied to the information recording medium is absorbed by the recording medium and converted into a thermal energy. By this thermal energy, the optically reversible material contained in the recording layer is heated to its melting point or more. The crystal lattice of the optically reversible material is thus disordered, and becomes to the random state. When the application of the laser beam is stopped, the recording layer is rapidly cooled. As a result, the optically reversible material in the random state is solidified as is and fixed in an amorphous phase.

When the recorded information is erased, a laser beam applied to the information recording medium is absorbed by the recording medium and converted into a thermal energy. By this thermal energy, the optically reversible material contained in the recording layer is heated to its crystalization temperature or more. The disordered crystal lattice is thus restored to the state before the information is recorded. When the application of the laser beam is stopped, the recording layer is rapidly cooled. As a result, the optically reversible material is crystalized, and turned to the initial state.

Therefore, when information is recorded in and erased from the information recording medium of the present invention, any method can be applied so long as it can generate a thermal energy in the recording layer.

In the information recording medium according to the present invention, a hydrocarbon polymer in which hydrocarbons are cross-linked with high density, i-carbon, graphite, diamond, or a composite thereof can be used as the carbon-based material which serves as the matrix. These carbon-based materials mainly contain carbon, and they can further contain H, N and/or O, if necessary. The thermal decomposition temperature of the carbon-based material used in the present invention is 600° C. or more, preferably 800° C. or more, and more preferably 1000° C. or more.

The optically reversible material which can be used in the present invention is, as mentioned previously, a material having the structures of two or more types which reversibly transform from one another depending on the power or the wavelength of the applied electromagnetic waves. The material of each structure has its own optical characteristics, such as reflectivity, absorption, transmittance and refractive index.

Any organic and inorganic materials, metals, and metalloids having the above-described optically reversible characteristics can be used as the optically reversible materials in the present invention. Specific examples of such materials include chalcogens such as Te and Se, alloys of chalcogens, materials whose crystalline phase is optically changeable, such as Zn-Ag and Cu-Al-Ni, phthalocyanine-type pigments whose crystalline phase is optically changeable, and organic chalcogen compounds prepared by plasma CVD, such as diphenyl tellurium, diphenyl selenium, dimethyl tellurium, dimethyl selenium, tellurium diisopropoxy diacetylacetonate and selenium diisopropoxy diacetylacetonate.

The amount of the optically reversible material incorporated into the recording layer is 5 to 95 wt.%, preferably 20 to 80 wt.%, of the total weight of the recording layer.

It is preferable that the optically reversible material exist in the recording layer as finely-divided particles having a size of 100 nm or less, preferably 30 nm or less.

The recording layer can be formed by reactive sputtering, reactive vapor deposition, plasma CVD, optical CVD, or the combination thereof. The thickness of the recording layer is not particulary limited, and, in general, it is 10 to 1000 nm, preferably 20 to 500 nm.

In the case where a chalcogen is used as the optically reversible material, the recording layer can be formed in the following manner.

The starting material, which is an organic metallic compound or organic metallic complex containing a chalcogen, is subjected to plasma CVD, preferably plasma CVD utilizing a glow discharge, in the presence of a carrier gas, and, if necessary, a reactive gas. Thus, the starting material is deposited on a substrate arranged inside a vacuum reaction apparatus to form a film, an aimed recording layer.

The conditions for the film formation are as follows:

The gas pressure for the reaction is approximately 0.001 to 10 Torr, preferably 0.002 to 2 Torr; the electric power applied for the glow discharge is 1 to 300 W, preferably 5 to 100 W; the discharging time is 1 to 180 minutes, preferably 2 to 120 minutes; and the temperature of the substrate is in the range from 0° to 350° C., preferably from 20° to 200° C.

Examples of the starting material for the recording layer include diisopropoxy diacetylacetone tellurium, tetraethoxy tellurium, tetrapropoxy tellurium, dimethyl tellurium, diethyl tellurium, diisopropoxy diacetylacetone selenium, tetraethoxy selenium, tetrapropoxy selenium, dimethyl selenium and diethyl selenium.

He, Ne, Ar or $N_2$ can be used as the carrier gas, and $O_2$, CO, $CO_2$, $CH_4$ or $C_2H_4$ can be used as the reactive gas.

The recording layer in the present invention can also be prepared using, as the starting material, a polymer prepared by plasma-polymerizing the following organic metallic compound.

When the organic metallic compound is employed as the starting material, the particle size of the metal or metallic compound dispersed in the plasma-polymerized film can be controlled at the atomic level, and the size distribution can also be made narrow. Moreover, the matrix and finely-divided metallic particles are simultaneously prepared from the single starting material.

Examples of such an organic metallic compound include organoaluminum compounds such as trimethyl aluminum, triethyl aluminum and triisobutyl aluminum, organoarsenic compounds such as trimethyl arsenic and triethyl arsenic, organoberyllium compounds such as dimethyl beryllium, diethyl beryllium, dipropyl beryllium and dibutyl beryllium, organobismuth compounds such as trimethyl bismuth and triethyl bismuth, organocadmium compounds such as dimethyl cadmium and diethyl cadmium, organogermanium compounds such as tetramethyl germanium and tetraethyl germanium, organomercury compounds such as dimethyl mercury and diethyl mercury, organoindium compounds such as trimethyl indium, triethyl indium, triisobutyl indium and tributyl indium, organolithium compounds such as butyl lithium, organomagnesium compounds such as dimethyl magnesium, organophosphorus compounds such as trimethyl phosphorus and triethyl phosphorus, organolead compounds such as tetramethyl lead and tetraethyl lead, organoantimony compounds such as trimethyl antimony and triethyl antimony, organosulfur compounds such as dimethyl sulfur, diethyl sulfur and carbon disulfide, organoselenium compounds such as dimethyl selenium, diethyl selenium and diphenyl selenium, organosilane compounds such as tetramethyl silane, tetraethyl silane, tetrapropyl silane and tetrabutyl silane, organotin compounds such as tetramethyl tin, tetraethyl tin, tetrapropyl tin and tetrabutyl tin, organotellurium compounds such as dimethyl tellurium, diethyl tellurium and diphenyltellurium, organothallium compounds such as trimethyl thallium and triethyl thallium, organozinc compounds such as dimethyl zinc and diethyl zinc, and cyclopentadienyl compounds of La, Ce, Pr, Nd, Sm, Gd, Dy, Er, Yb, Sc, Y, Th, Mn and Mg.

In addition, halogenated organometallic compounds can also be employed, which are prepared by substituting some or all hydrogen atoms of the above-described organometallic compounds with halogen atoms such as fluorine atoms, chlorine atoms, bromine atoms or iodine atoms.

Using the above organometallic compound as the starting material, a film can be prepared by a direct current glow discharge decomposition method or an alternate current glow discharge decomposition method. Especially, the RF glow discharge decomposition method, which is the known method, is preferred.

In the case where the RF glow discharge decomposition method is employed, a film for the recording layer can be formed under the following conditions:

RF frequency: 100 kHz to 50 MHz, preferably 13.56 MHz

RF power: 1 to 500 W, preferably 5 to 200 W

Reaction pressure: 0.001 to 10 Torr, preferably 0.003 to 2 Torr

Substrate temperature: $-50°$ to $300°$ C., preferably $0°$ to $200°$ C.

It is preferable that the heat vaporization temperature of the monomer be maintained so that the vapor pressure of the starting material reaches to $10^{-3}$ to 100 Torr. It is not necessary to strictly control the substrate temperature so long as it falls within the above range; the substrate temperature can of course be fixed at a specific temperature, or can be gradually risen within the above-mentioned range.

The substrate can be arranged not only on the RF electrode side or earth electrode side but also at any desired places inside the apparatus.

Other reactive compounds, carrier gasses and impurities may be added to the reaction system, if necessary.

Thus, a desired film of the plasma-polymerized organometallic compound, which serves as the recording layer, is formed on the substrate. The thickness of the film is 50 Å to 5 $\mu$m, preferably 100 Å to 2 $\mu$m.

Furthermore, in the present invention, the recording layer can also be formed by subjecting the following metallic complex to plasma polymerization. The film thus obtained contains finely-divided metallic particles dispersed more uniformly than those in the above-mentioned film.

Examples of the metal complexes as the starting material are as follows:

(1) Iron Complexes

Iron(III) acetylacetonate, ferrocene, and iron complexes containing a chelating agent such as Tiron, ethylene diamine, 2,2'-dipyrridine, 1,10-phenanthroline, dithiol, oxine, thioxine or 3-mercapto-p-cresol.

(2) Cobalt Complexes

Cobalt(II) acetylacetonate, cobalt(III) acetylacetonate, cobaltcene, and cobalt complexes containing a chelating agent such as Tiron, ethylene diamine, 2,2'-dipyrridine, 1,10-phenanthroline, dithiol, oxine, thioxine or 3-mercapto-p-cresol.

(3) Nickel Complexes

Nickel acetylacetonate (NiAA), dimethyl glyoxime, benzyl dioxime, cyclohexane-1,2-dion-dioxime, and nickel complexes containing one or two chelating agents selected from Tiron, ethylene diamine, 2,2'-dipyrridine, 1,10-phenanthroline, dithiol, oxine, thioxine and 3-mercapto-p-cresol.

(4) Copper Complexes

Copper acetylacetonate (CuAA), and a copper complexes containing one or two chelating agents selected from Tiron, ethylene diamine, 2,2'-dipyrridine, 1,10-phenanthroline, dithiol, oxine, thioxine or 3-mercapto-p-cresol.

(5) Titanium Complexes

Diisopropoxytitanium bis(acetylacetonate) and bis(acetylacetonate)titanium oxide.

(6) Tellurium Complexes

Tellurium diisopropoxy diacetylacetonate (7) Selenium Complexes

Selenium diisopropoxy diacetylacetonate (8) Others

Cyclopentadienyl compounds of La, Ce, Pr, Nd, Sm, Gd, Dy, Er, Yb, Sc, Y, Th, Mn and Mg, and acetylacetonate complexes of Ca, Sr, Ba, La, Ce, Y, Sm, Tb, Er, Yb, V and Nb, having a high vapor pressure.

In addition to the above complexes, halogenated organometallic complexes can also be employed, which are prepared by substituting some or all hydrogen atoms of the above complexes with halogen atoms such as fluorine atoms, chlorine atoms, bromine atoms or iodine atoms.

In the case where the above organometallic complex is employed as the starting material, a film for the recording layer can be prepared by the same manner and under the same conditions as employed for the film formation using the organometallic compound as the starting material.

The thickness of the above-obtained film is 50 Å to 5 $\mu$m, preferably 100 Å to 2 $\mu$m.

Furthermore, the recording layer can also be prepared by subjecting $CH_3Cl$ containing an optically reversible material to plasma polymerization.

The bond energies of C—Cl bond and C—H bond in $CH_3Cl$ are 3.4 eV and 4.3 eV, respectively. $CH_3Cl$, therefore, yields $CH_3$ radicals more easily than $CH_4$. In general, $CH_3$ radicals contribute to the formation of a mechanically strong thin layer in which carbons are cross-linked with high density.

The $CH_3Cl$ polymer film can be formed by any one of the known methods accompanied by a plasma process, such as reactive sputtering, plasma reactive deposition and plasma CVD.

The thickness of the film thus prepared is not limited, and the preferred thickness is 10 to 1000 nm, more preferably 20 to 500 nm.

The content of the optically reversible material in the film is 5 to 95 wt.%, preferably 20 to 80 wt.%, of the total weight of the film.

In the case where the optically reversible material is in the form of finely-divided particles, the preferred particle size is 100 nm or less, more preferably 30 nm or less.

In addition, the recording layer can also be prepared by subjecting a pigment containing an optically reversible material to plasma polymerization.

Pigments are inherently heat-resistant and photoresistant. Therefore, a film which is a cross-linked material obtained by subjecting a pigment to plasma polymerization can acquire heat-resistance and photoresistance higher than those of the original pigment. Using such a film as the matrix, the recording sensitivity, the expected life span of the recording medium, and the erasion ratio can be improved.

The pigment polymer film can be formed by any one of the known methods accompanied by a plasma process, such as reactive sputtering, plasma reactive deposition and plasma CVD.

The thickness of the film thus prepared is not limited, and the preferred thickness is 10 to 1000 nm, more preferably 20 to 500 nm.

The content of the optically reversible material in the film is 5 to 95 wt.%, preferably 20 to 80 wt.%, of the total weight of the film.

In the case where the optically reversible material is in the form of finely-divided particles, the preferred particle size is 100 nm or less, more preferably 30 nm or less.

Any heat-resistant pigments can be used as the starting material. Of these, phthalocyanine-type pigments and quinacridone-type pigments are suitable for plasma polymerization because they are sublimable.

Any materials can be used as the substrate in the present invention. For example, plastics such as polymethyl methacrylate and polycarbonate, glass, ceramics and metals can be employed. Moreover, preformats for address signals, and pregrooves for guide grooves may be provided on the surface of the substrate. The shape of the substrate can be determined depending on the purpose, for instance, the shape of a tape, a disc, a drum or a belt.

The information recording medium according to the present invention is basically composed of the substrate and the recording layer prepared by the plasma polymerization as described above. However, as shown in FIG. 2, the recording medium can further be provided with other layers, if necessary.

In FIG. 2, reference numeral 1 denotes a substrate, reference numeral 2 denotes a protective layer made of, for instance, $SiO_2$ or $Si_3N_4$, reference numeral 3 denotes a recording layer, reference numeral 4 denotes a protective layer and reference numeral 5 denotes a protective plate. If necessary, a reflective layer can also be provided to the recording medium.

Electron beams, X-rays, ultraviolet rays, visible light, infrared rays and microwaves can be applied to the recording medium of the present invention as the electromagnetic waves. However, the most suitable one is semiconductor laser light because the light can be emitted from a small-sized device which can be conveniently attached to the driving member.

The information recording medium according to the present invention can be prepared in the following manner.

The most preferable manner is such that a metal, an alloy, an organometallic compound or an organometallic complex, at least containing a chalcogen, is subjected to plasma CVD, preferably plasma CVD utilizing a glow discharge, along with a pigment or $CH_3Cl$ to form a film on a substrate arranged inside a vacuum reaction apparatus.

Examples of the chalcogen-containing starting material include metal tellurium, metal selenium, alloys such as Ge-Te, Ge-Te-Sb, Ge-Te-S, Ge-Se-S, Ge-Se-Sb, Ge-As-Se, In-Te, Se-Te and Se-As, diisopropoxy diacetylacetone tellurium, tetraethoxy tellurium, tetrapropoxy tellurium, dimethyl tellurium, diethyl tellurium, diphenyl tellurium, diisopropoxy diacetylacetone selenium, tetraethoxy selenium, tetrapropoxy selenium, dimethyl selenium, diethyl selenium, diphenyl selenium, triphenyl bismuth, trimethyl bismuth and triethyl bismuth.

As the pigment, a metal free phthalocyanine-type pigment, a metallic phthalocyanine-type pigment, a derivative thereof, or a quinacridone-type pigment is used.

The starting material is vaporized by either heating a mixture of the chalcogen-containing material and the pigment or heating the chalcogen-containing material and the pigment separately.

He, Ne, Ar or $N_2$ is employed as the carrier gas, and, if necessary, $O_2$, CO, $CO_2$, $CH_4$ or $C_2H_4$ which serves as a reactive gas can be added.

Either a direct current glow discharge apparatus or an alternate current glow discharge apparatus of a capacitive coupling type or an inductive coupling type can be used for the glow discharge in the present invention.

The gas pressure for the reaction is approximately 0.001 to 10 Torr, preferably 0.002 to 2 Torr. An electric power of 1 to 300 W, preferably 5 to 100 W, is supplied for 1 to 180 minutes, preferably 2 to 120 minutes, for the glow discharge. The temperature of the substrate is maintained in the range from 0° to 350° C., preferably from 20° to 200° C.

The information recording medium according to the present invention can be further provided with a protective layer made of a carbon-based material on the recording layer. Examples of the carbon-based material include hydrocarbon polymers in which hydrocarbons are cross-linked with high density, i-carbon, graphite, diamond and composites thereof.

These carbon-based materials contain carbon as the main component, and, if necessary, they can further contain H, N and/or O.

The thermal decomposition temperature of the carbon-based material is 600° C. or more, preferably 800° C. or more, and more preferably 1000° C. or more.

A thin film of the carbon-based material can be formed by any one of or the combination of the known methods such as sputtering, reactive sputtering, reactive vapor deposition, plasma CVD and photo CVD.

The thickness of the protective layer is not limited, and, in general, it is 10 to 1000 nm, preferably 20 to 500 nm.

The starting material for the carbon-based material is a hydrocarbon compound. The hydrocarbon compound is subjected to plasma CVD, preferably plasma CVD utilizing a glow discharge, to form a film of the carbon-based material on a substrate arranged inside a vacuum reaction apparatus. The above reaction can be conducted in the presence of a carrier gas or a reactive gas, if necessary.

The film is formed under the following conditions:

Gas pressure: 0.001 to 10 Torr, preferably 0.002 to 2 Torr

Power supplied for glow discharge: 1 to 300 W, preferably 5 to 100 W

Discharging time: 1 to 180 minutes, preferably 2 to 120 minutes

Substrate temperature: 0° to 350° C., preferably 20 to 200° C.

A hydrocarbon such as methane, ethane or propane, an alcohol such as methanol, ethanol or propanol, or an aromatic compound such as benzene, styrene or xylene can be used as the starting material.

An inert gas such as He, Ne, Ar and $N_2$ is used as a carrier gas, and $H_2$, $O_2$, CO or $CO_2$ is used as a reactive gas.

The glow discharge is conducted in a direct current glow discharging apparatus or an alternate current glow discharging apparatus of a capacitive coupling type or an inductive coupling type.

Furthermore, the information recording medium of the present invention can comprise, on the recording layer, a heat-radiation layer made of a carbon-based material in which finely-divided metallic particles are dispersed.

A hydrocarbon polymer, i-carbon, graphite, diamond, or a composite thereof can be employed as the carbon-based material used for the heat-radiation layer. To this carbon-based material, finely-divided particles of Au, Ag, Cu or Al are dispersed.

The carbon-based material contains carbon as the main component, and, if necessary, it can further contain H, N and/or O.

The thermal decomposition temperature of the carbon-based material is 600° C. or more, preferably 800° C. or more, and more preferably 1000° C. or more.

The thermal conductivity of the heat-radiation layer employed in the present invention is controlled in the wide range from 0.1 to 2000 $Wm^{-1}k^{-1}$ depending on the kind and the structure of the carbon and the metal.

The film of the carbon-based material in which finely-divided metallic particles are dispersed can be formed any one of the known methods such as co-vapor deposition or sputtering of an organic material and a metal, the combination of plasma CVD of an organic material and vapor deposition or sputtering of a metal, plasma CVD of an organometallic composite material (organometallic compound, organometallic complex, metallic alkoxide), and plasma CVD of an organic material and halogenated metallic compound.

The thickness of the heat-radiation layer is not limited, and the preferred thickness os 10 to 1000 nm, more preferably 20 to 500 nm. The particle size of the finely-divided particles dispersed in the heat-radiation layer is 50 nm or less, preferably 30 nm or less.

Other features of this invention will become apparent in the course of the following description of exemplary embodiments, which are given for illustration of the invention and are not intended to be limiting thereof.

EXAMPLE 1-1

On a glass substrate, a recording layer having a thickness of 80 nm was formed by subjecting diisopropoxy diacetylacetone tellurium as the starting material to plasma CVD, whereby information recording medium No. 1-1 according to the present invention was prepared.

The apparatus employed is shown in FIG. 3, in which reference numeral 5 indicates an RF power source, reference numeral 6 indicates a thermocouple, reference numeral 7 indicates an electrode, reference numeral 8 indicates the starting material, reference numeral 9 indicates a heater, reference numeral indicates 10 a vacuum gauge, reference numeral 11 indicates an oil diffusion pump, reference numeral 12 indicates an oil rotary pump, and reference numeral 13 indicates a heater-controlling unit.

The conditions for the above film formation were as follows:

| | |
|---|---|
| Substrate temperature: | 100° C. |
| Partial pressure of the starting material: | $2.0 \times 10^{-3}$ Torr |
| Flow rate of Ar: | 10.0 SCCM |
| Reaction pressure: | $5.0 \times 10^{-2}$ Torr |
| High frequency power: | 70 W, 13.56 MHz |
| Film formation time: | 60 minutes |

The reflectivity and the absorption at a wavelength of 700 to 850 nm of the above-obtained recording layer were 25% and 60%, respectively.

The recording layer was analyzed by fourier transform infrared spectroscopy (hereinafter referred to as FTIR), X-ray photo-electron spectroscopy (hereinafter referred to as XPS) and Raman spectroscopy. As a result, it was confirmed that the recording layer was mainly composed of graphite carbon, i-carbon and Te.

According to the observation by a transmission electron microscope (hereinafter referred to as TEM), finely-divided particles of Te, having a diameter of approximately 20 nm, were found to be dispersed in the recording layer.

In order to evaluate the recording and erasing characteristics of the recording layer, an optical disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using $Si_3N_4$ by sputtering. An ultraviolet ray-setting resin was coated onto the protective layer B to form the adhesive layer. A polycarbonate plate 0.5 mm in thickness was used as the protective plate. The recording layer was formed by using the same apparatus under the same conditions as mentioned above.

While rotating the thus obtained optical disk at 1800 rpm, information was repeatedly recorded and erased by applying a power-modulated laser beam to the optical disk at a line speed of 6 m/sec. As a result, the C/N ratio and the erasion ratio were found to be 50 dB and 30 dB, respectively. It was thus confirmed that the recording layer had sufficient recording and erasing characteristics.

EXAMPLE 1-2

Example 1-1 was repeated except that the diisopropoxy diacetylacetone tellurium used in Example 1-1 as the starting material with a partial pressure of $5.0 \times 10^{-2}$ Torr was replaced by diisopropoxy diacetylacetone selenium with a partial pressure of $1.0 \times 10^{-3}$ Torr, whereby information recording medium 1-2 according to the present invention was prepared.

The information recording and erasing characteristics of the above-obtained recording layer was evaluated in the same manner as in Example 1-1. As a result, the recording layer was found to have sufficient recording and erasing characteristics.

EXAMPLE 2-1

On a substrate, a recording layer having a thickness of 100 nm was formed using diphenyl tellurium, which is liquid at room temperature and under normal pressure, as the starting material by plasma CVD, whereby information recording medium No. 2-1 according to the present invention was prepared.

Figure 4:
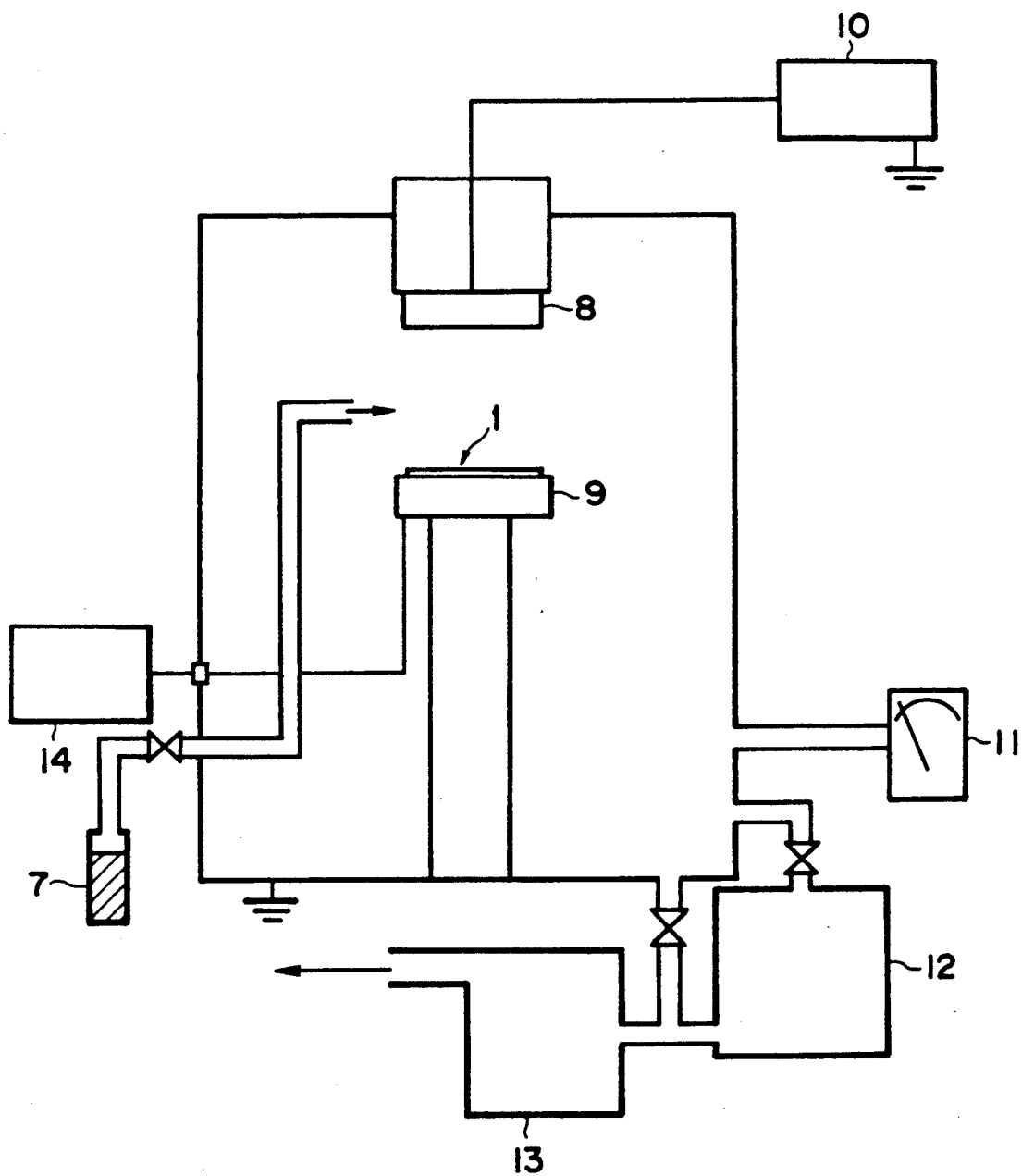
FIG. 4 is a diagram of an apparatus for plasma CVD used in Examples 2-1 and 2-2 which will be described later in this specification.

The apparatus employed is shown in FIG. 4, in which reference numeral 1 indicates a substrate, reference numeral 7 indicates the starting material, reference numeral 8 indicates an RF electrode, reference numeral 9 indicates a thermocouple, reference numeral 10 indicates an RF power source, reference numeral 11 indicates a vacuum gauge, reference numeral 12 indicates an oil diffusion pump, reference numeral 13 indicates an oil rotary pump, and reference numeral 14 indicates a controlling unit for the substrate temperature.

The conditions for the above film formation were as follows:

| | |
|---|---|
| Substrate: | a glass plate, a silicon wafer, a polyethylene terephthalate plate, a polycarbonate plate |
| Temperature of substrate: | 25° C. |
| Temperature of the starting material: | 25° C. |
| Flow rate of Ar: | 40 SCCM |
| Flow rate of $H_2$: | 40 SCCM |
| Reaction pressure: | $1 \times 10^{-1}$ Torr |
| High frequency power: | 50 W, 13.56 MHz |

The recording layer was analyzed by FTIR and XPS and observed by a TEM. As a result, it was found that the recording layer was composed of a carbon-based material in which finely-divided particles of tellurium were dispersed.

According to thermal analyses by highly sensitive differential scanning calorimetry (hereinafter referred to as DSC) and thermogravimetric analysis (hereinafter referred to as TGA), it was confirmed that the recording layer was neither decomposed nor underwent weight loss within the temperature range of 600° C. or less.

In order to evaluate the information recording and erasing characteristics of the recording layer, an optical disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using $Si_3N_4$ by sputtering. An ultraviolet ray-setting resin was coated onto the protective layer B to form the adhesive layer. A polycarbonate plate 0.5 mm in thickness was used as the protective plate. The recording layer was formed by using the same apparatus under the same conditions as mentioned above.

While rotating the thus obtained optical disk at 1800 rpm, information was repeatedly recorded and erased by applying a power-modulated laser beam to the optical disk at a line speed of 6 m/sec. As a result, the C/N ratio and the erasion ratio were found to be 50 dB and 30 dB, respectively. It was thus confirmed that the recording layer had sufficient recording and erasing characteristics.

COMPARATIVE EXAMPLE 2-1

On a substrate, a recording layer having a thickness of 100 nm was formed using diphenyl tellurium as the starting material by plasma CVD, whereby comparative information recording medium No. 2-1 was prepared.

The apparatus employed in the above is shown in FIG. 4.

The conditions for the above film formation were as follows:

| | |
|---|---|
| Substrate: | a glass plate, a silicon wafer, a polyethylene terephthalate plate, a polycarbonate plate |
| Temperature of substrate: | 25° C. |
| Temperature of the starting material: | 25° C. |
| Flow rate of Ar: | 40 SCCM |
| Flow rate of $H_2$: | 0 SCCM |
| Reaction pressure: | $1 \times 10^{-3}$ Torr |
| High frequency power: | 50 W, 13.56 MHz |

The recording layer was analyzed by FTIR and XPS and observed by a TEM. As a result, it was confirmed that the recording layer was composed of a carbon-based material in which finely-divided particles of tellurium were dispersed.

According to thermal analyses by highly sensitive DSC and TGA, it was confirmed that the recording layer was decomposed and lost its weight within the temperature range of 400° C. or less.

In order to evaluate the recording and erasing characteristics of the recording layer, an optical disk was prepared in the same manner as in Example 2-1.

As a result, it was found that information could be recorded in the optical disk, but the recorded information could not be erased. It was thus judged that the above-obtained recording layer was not suitable for a rewritable-type information recording medium.

The above evaluation results demonstrate that a recording layer containing as the matrix a carbon-based material which is thermally decomposed at a temperature of 450° C. or less is not rewritable. In contrast, a recording layer containing as the matrix a carbon-based material which is not decomposed at a temperature identical to the melting point of tellurium or less is rewritable. The C/N ratio and the erasion ratio of such a recording layer are sufficient for the practical use.

EXAMPLE 2-2

Example 2-1 was repeated except that the diphenyl tellurium used in Example 2-1 as the starting material was replaced by diphenyl selenium and diphenyl tellurium, whereby information recording medium No. 2-2 according to the present invention was prepared.

The recording layer of the above recording medium was found to be composed of a carbon-based material in which finely-divided particles of a Se-Te alloy were dispersed.

The information recording and erasing characteristics of the recording layer was evaluated in the same manner as in Example 2-1. As a result, the recording layer was confirmed to have sufficient characteristics and the improved recording sensitivity. This is because the melting point of the Se-Te alloy contained in the recording layer is lower than that of Te contained in the recording layer prepared in Example 2-1.

EXAMPLE 3-1

Figure 5:
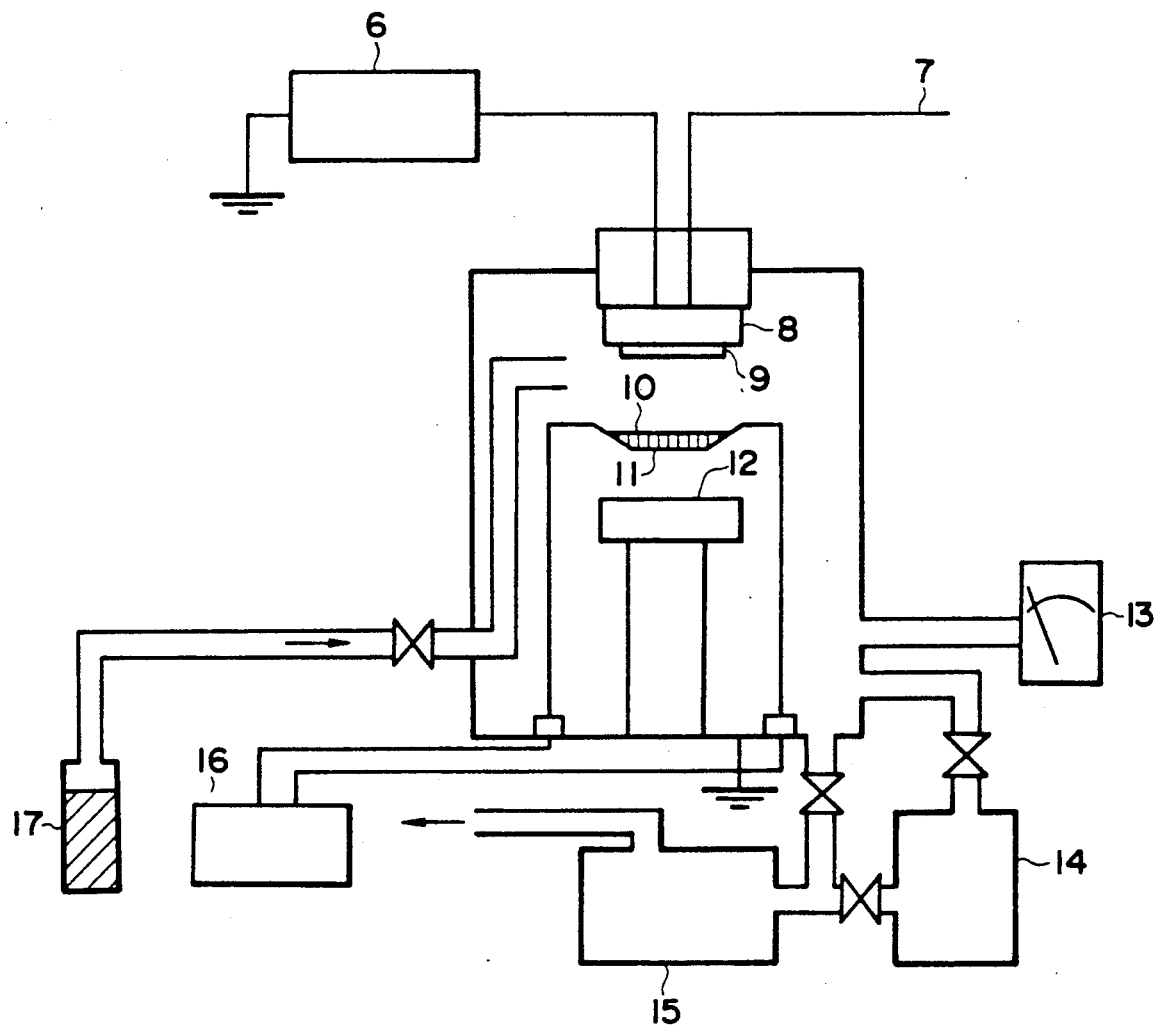
FIG. 5 is a diagram of an apparatus for plasma CVD used in Examples 3-1 to 3-3 which will be described later in this specification.

A recording layer according to the present invention was prepared by plasma CVD using the apparatus shown in FIG. 5.

In FIG. 5, reference numeral 6 indicates an RF electrode, reference numeral 7 indicates a thermocouple, reference numeral 8 indicates an electrode, reference numeral 9 indicates a substrate, reference numeral 10 indicates the starting material, reference numeral 11 indicates a heater, reference numeral 12 indicates a counter electrode, reference numeral 13 indicates a vacuum gauge, reference numeral 14 indicates an oil diffusion pump, reference numeral 15 indicates an oil rotary pump, reference numeral 16 indicates a heater-controlling unit, and reference numeral 17 indicates a $CH_3Cl$ cylinder.

A material selected from glass, silicon wafer, polyethylene terephthalate and polycarbonate was used for the substrate 9. The temperature of the substrate was fixed at 25° C. 100 mg of diisopropoxy diacetylacetone tellurium was used as the starting material 10.

The starting material was vaporized by application of heat, and $CH_3Cl$ was introduced into the reaction apparatus at a flow rate of 100 SCCM. The starting material was thus reacted with $CH_3Cl$.

The conditions for the reaction were as follows:

| | |
|---|---|
| High-frequency power: | 70 W, 13.56 MHz |
| Discharging time: | 60 minutes |
| Reaction pressure: | $1.0 \times 10^{-3}$ Torr |

The reflectivity and the absorption at a wavelength of 700 to 850 nm of the above-obtained recording layer were 30% and 60%, respectively.

The recording layer was analyzed by FTIR, XPS and Raman spectroscopy. As a result, it was confirmed that the recording layer was mainly composed of graphite carbon, i-carbon and Te.

According to the observation by a TEM, finely-divided particles of Te, having a diameter of approximately 20 nm, were found to be dispersed in the recording layer.

Furthermore, it was confirmed by an X-ray diffraction analysis that the recording layer was in an amorphous phase.

In order to evaluate the information recording and erasing characteristics of the recording layer, an optical disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using $Si_3N_4$ by sputtering. An ultraviolet ray-setting resin was coated onto the protective layer B to form the adhesive layer. A polycarbonate plate 1.2 mm in thickness was used as the protective plate. The recording layer was formed by using the same apparatus under the same conditions as mentioned above.

Information was repeatedly recorded and erased by applying a power-modulated laser beam to the optical disk at a line speed of 6 m/sec. As a result, the C/N ratio and the erasion ratio were found to be 50 dB and 30 dB, respectively. It was thus confirmed that the recording layer had sufficient recording and erasing characteristics.

EXAMPLE 3-2

Example 3-1 was repeated except that the diisopropoxy diacetylacetone tellurium used in Example 3-1 as the starting material was replaced by metal tellurium, whereby a recording layer according to the present invention was prepared.

The information recording and erasing characteristics of the above-obtained recording layer were evaluated in the same manner as in Example 3-1. As a result, it was confirmed that the recording layer had almost the equal characteristics to those of the recording layer prepared in Example 3-1.

EXAMPLE 3-3

Example 3-1 was repeated except that the diisopropoxy diacetylacetone tellurium used in Example 3-1 as the starting material was replaced by triphenyl bismuth, whereby a recording layer according to the present invention was prepared.

The information recording and erasing characteristics of the above-obtained recording layer were evaluated in the same manner as in Example 3-1. As a result, it was confirmed that the recording layer had almost the equal characteristics to those of the recording layer prepared in Example 3-1.

EXAMPLE 4-1

Figure 6:
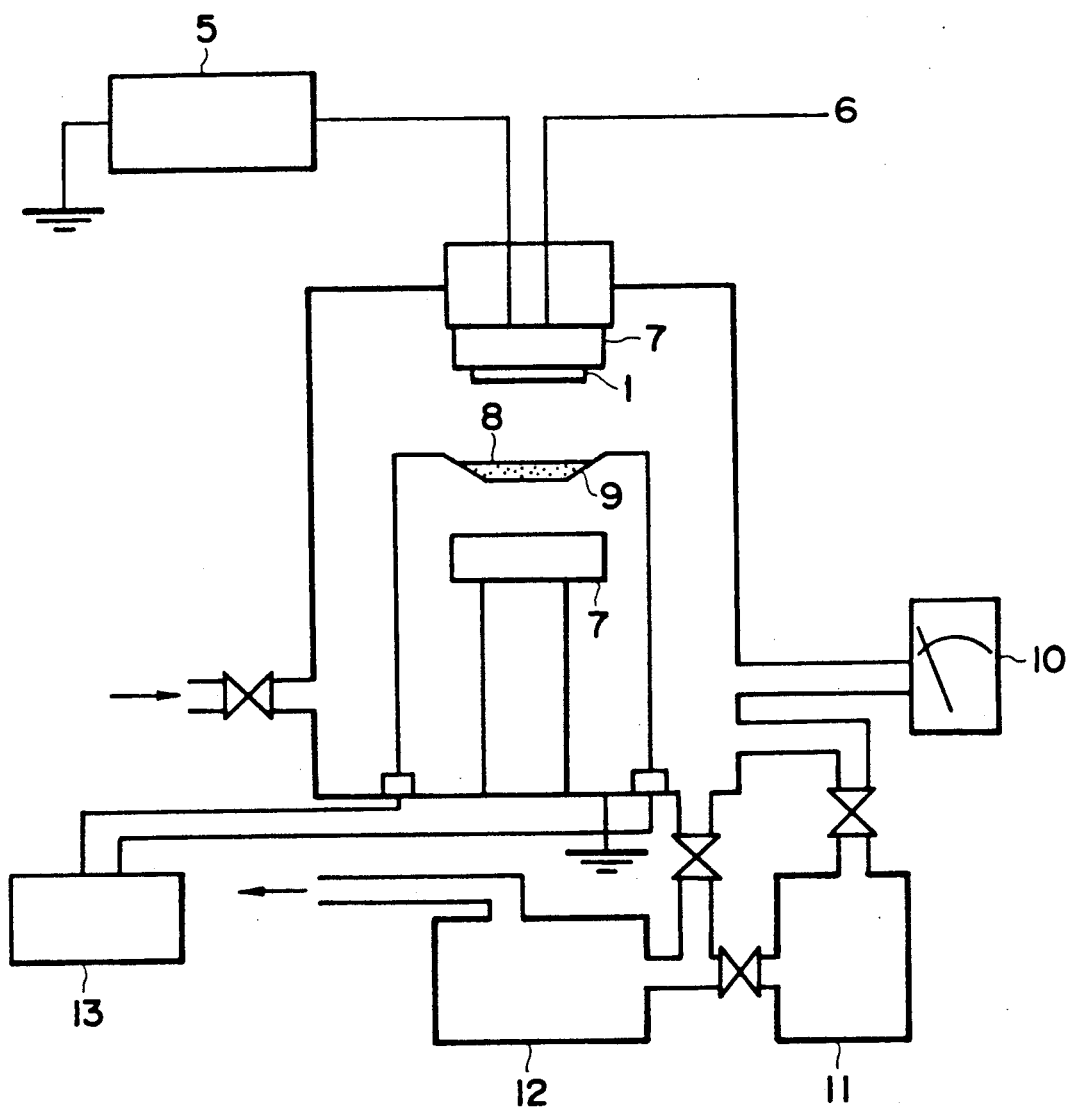
FIG. 6 is a diagram of an apparatus for plasma CVD used in Examples 4-1 to 4-4 which will be described later in this specification.

A recording layer according to the present invention was prepared by plasma CVD using the apparatus shown in FIG. 6.

In FIG. 6, reference numeral 6 indicates an RF electrode, reference numeral 7 indicates a thermocouple, reference numeral 8 indicates an electrode, reference numeral 9 indicates a substrate, reference numeral 10 indicates the starting material, reference numeral 11 indicates a heater, reference numeral 12 indicates a counter electrode, reference numeral 13 indicates a vacuum gauge, reference numeral 14 indicates an oil diffusion pump, reference numeral 15 indicates an oil rotary pump, reference numeral 16 indicates a heater-controlling unit.

A material selected from glass, silicon wafer, polyethylene terephthalate and polycarbonate was used for the substrate 9. The temperature of the substrate was fixed at 25° C. 100 mg of diisopropoxy diacetylacetone tellurium and 30 mg of copper phthalocyanine were used as the starting materials 10.

The reaction wa conducted under the following conditions:

| | |
|---|---|
| High-frequency power: | 70 W, 13.56 MHz |
| Discharging time: | 10 minutes |
| Reaction temperature: | $1.0 \times 10^{-2}$ Torr |

The reflectivity and the absorption at a wavelength of 830 nm of the above-obtained recording layer, having a thickness of 110 nm, were 20% and 50%, respectively.

The recording layer was analyzed by FTIR and UV-VIS sepctroscopy. As a result, it was confirmed that the recording layer had a phthalocyanine structure.

Although the copper phthalocyanine vaporizes at a temperature between 420° and 430° C. under atmospheric pressure, the obtained recording layer containing the copper phthalocyanine was unchanged even when it was heated to 500° C. under a reduced pressure of $1 \times 10^{-3}$ Torr or less. It was thus confirmed that the copper phthalocyanine was cross-linked and became thermally stable.

According to an X-ray diffraction analysis, no patterns of copper phthalocyanine and tellurium were found. It was thus confirmed that the recording layer was in an amorphous phase.

In order to evaluate the information recording and erasing characteristics of the recording layer, an optcial disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using $Si_3H_4$ by sputtering. An ultraviolet ray-setting resin was coated onto the protective layer B to form the adhesive layer. A polycarbonate plate 1.2 mm in thickness was used as the protective plate. The recording layer was formed by using the same apparatus under the same conditions as mentioned above.

While rotating the optical disk at 1800 rpm, information was repeatedly recorded and erased by applying a power-modulated laser beam having a wavelength of 830 nm to the optical disk at a line speed of 6 m/sec. As a result, the C/N ratio and the erasion ratio were found to be 52 dB and $-30$ dB, respectively. It was thus confirmed that the recording layer had sufficient recording and erasing characteristics.

EXAMPLE 4-2

Example 4-1 was repeated except that the copper phthalocyanine used in Example 4-1 as one of the starting materials was replaced by a metal-free phthalocyanine-type pigment, whereby a recording layer according to the present invention was prepared.

The information recording and erasing characteristics of the above-obtained recording layer were evaluated in the same manner as in Example 4-1. As a result, it was confirmed that the recording layer had almost the equal characteristics to those of the recording layer prepared in Example 4-1.

EXAMPLE 4-3

Example 4-1 was repeated except that the starting materials used in Example 4-1 were replaced by 100 mg of diisopropoxy diacetylacetone tellurium and 30 mg of 2,3-quinacridone, and the high-frequency power was changed from 70 W, 13.56 MHz to 50 W, 13.56 MHz, whereby a recording layer according to the present invention was prepared.

The reflectivity and the absorption at a wavelength of 830 nm of the above-obtained recording layer, having a thickness of 100 nm, were 25% and 55%, respectively.

The recording layer was analyzed by FTIR and UV-VIS spectrscopy. As a result, it was confirmed that the recording layer had a quinacridone structure.

Although 2,3-quinacridone is fused at a temperature of approximately 400° C. under normal pressure, the recording layer containing 2,3-quinacridone was unchanged even when it was heated to a temperature of 600° C. under a reduced pressure of $1 \times 10^{-3}$ Torr. It was thus confirmed that the 2,3-quinacridone was cross-linked and became thermally stable in the course of plasma polymerization.

According to an X-ray diffraction analysis, no patterns of 2,3-quinacridone and tellurium were found. It is thus confirmed that the recording layer was in an amorphous phase.

The information recording and erasing characteristic of the above-obtained recording layer were evaluated in the same manner as in Example 4-1. As a result, the C/N ratio and the erasion ratio were found to be 48 dB and $-30$ dB, respectively. The recording layer was thus confirmed to have sufficient recording and erasing characteristics.

EXAMPLE 4-4

Example 4-3 was repeated except that the diisopropoxy diacetylacetone tellurium used in Example 4-3 as one of the starting materials was replaced by metal tellurium, whereby a recording layer according to the present invention was prepared.

The obtained recording layer was evaluated in the same manner as in Example 4-3. As a result, it was confirmed that the recording layer had almost the equal characteristics to those of the recording layer prepared in Example 4-3.

EXAMPLE 5-1

Figure 7:
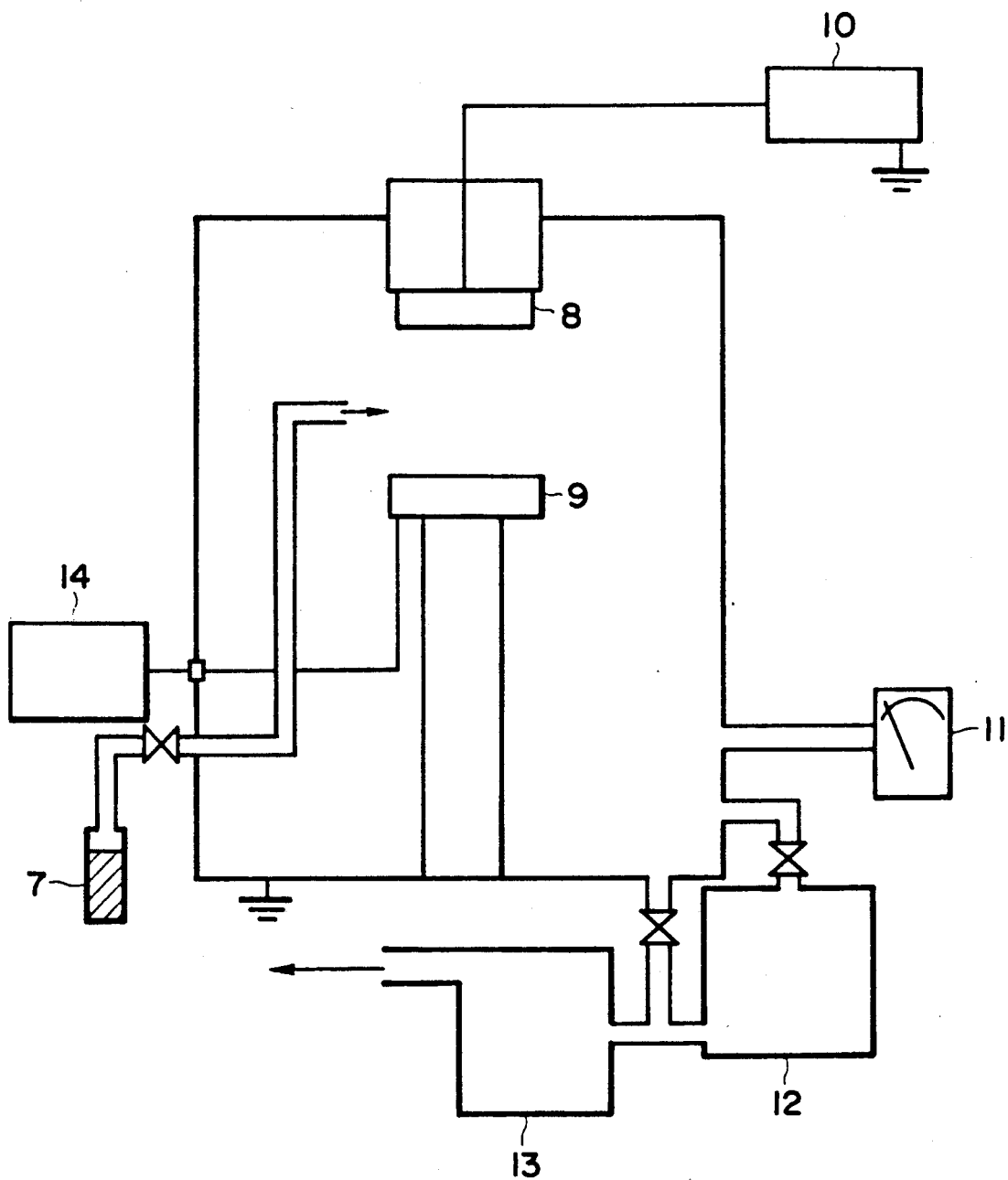
FIG. 7 is a diagram of an apparatus for plasma CVD used in Examples 5-1 to 5-3 which will be described later in this specification.

A recording layer according to the present invention having a thickness of 100 nm was prepared using the apparatus shown in FIG. 7. In this apparatus, four substrates below described were simultaneously arranged on a counter electrode 9, and diphenyl tellurium, which is liquid at room temperature under normal pressure, was placed in a vessel 7 for the starting material, thereby proceeding the film formation.

In FIG. 7, reference numeral indicates a vessel for the starting material, reference numeral 8 indicates an RF electrode, reference numeral 9 indicates a counter electrode, reference numeral 10 indicates an RF power source, reference numeral 11 indicates a vacuum gauge, reference numeral 12 indicates an oil diffusion pump, reference numeral 13 indicates an oil rotary pump, and reference numeral 14 indicates a controlling unit for the substrate temperature.

As the substrates, (1) a glass plate with 20 mm × 20 mm, (2) a silicon wafer with 20 mm × 20 mm, (3) a polyethylene terephthalate plate with 20 mm × 20 mm, and (4) a polycarbonate disk having a diameter of 85 mm were employed.

The conditions for the film formation were as follows:

| | |
|---|---|
| Temperature of substrate: | 25° C. |
| Temperature of unit 7: | 75° C. |
| Flow rate of Ar: | 40 SCCM |
| Reaction pressure: | $1 \times 10^{-2}$ Torr |
| High frequency power: | 50 W, 13.56 MHz |

The above-obtained recording layers formed on each substrate were subjected to the following analyses and observation:

(1) The recording layer formed on the glass plate: subjected to the analyses by TGA and DSC
(2) The recording layer formed on the silicon wafer: subjected to the analyses by FTIR and XPS
(3) The recording layer formed on the polyethylene terephthalate. plate: subjected to the observation by a TEM
(4) The recording layer formed on the polycarbonate plate: observed the optical recording characteristics.

From the analyses by FTIR, XPS and observation by a TEM, it was found that the recording layer was made of a carbon-based material in which finely-divided particles of tellurium having a particle size of 50 Å were dispersed. It was also confirmed by an X-ray diffraction analysis that the recording layer was in an amorphous phase. When the recording layer was subjected to highly sensitive DSC and TGA, it was confirmed that the recording layer was decomposed and lost its weight within the temperature range of 450° C. or less.

In order to evaluate the recording characteristics, a recording layer with 100 nm in thickness was formed on a polycarbonate substrate provided with pregrooves. The conditions for the film formation were the same as the above.

While rotating the above-obtained optical disk at 1800 rpm, a laser beam was applied to the disk so that a laser power of 3 mW could reach the recording layer. As a result, bubbles were formed on the recording layer, and information was recorded with the sufficient contrast.

When a laser beam with a laser power of 9 mW was applied to the above recording layer, the laser applied portion was vaporized, and the hole-type information recording was achieved.

It was thus confirmed that the recording medium using the recording layer obtained above can serve as both a bubble-heat mode type and a hole type rewritable information recording media depending on the laser power applied thereto.

The reflectivity of the recording layer was not lowered even when it was preserved at 30° C. and 90% RH for 300 days. This is because tellurium particles are surrounded by the matrix of the carbon-based material which is resistant to weather.

EXAMPLE 5-2

A recording layer according to the present invention having a thickness of 100 nm was prepared using diphenyl tellurium as the starting material by the glow discharge decomposition method. The apparatus used for the above reaction is shown in FIG. 7. A glass plate, a silicon wafer, a polyethylene terephthalate plate and a polycarbonate plate were respectively used for the substrate.

The conditions for the above reaction were as follows:

Temperature of substrate: 90° C.
Temperature of the starting material: 75° C.
Flow rate of Ar: 30 SCCM
Flow rate of $H_2$: 100 SCCM
Reaction pressure: $1 \times 10^{-2}$ Torr
High-frequency power: 100 W, 13.56 MHz From the analyses by FTIR and XPS and the observation by a TEM, it was confirmed that the recording layer was made of a carbon-based material in which finely-divided particles of tellurium having a particle size of 50 Å were dispersed.

According to an X-ray diffraction analysis, the recording layer was found in an amorphous phase. It was also confirmed by highly sensitive DSC and TGA that the recording layer was neither decomposed nor underwent weight loss within the temperature range of 500° C. or less.

In order to evaluate the information recording and erasing characteristics of the recording layer, an optcial disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using $Si_3H_4$ by sputtering. An ultraviolet ray-setting resin was coated onto the protective layer B to form the adhesive layer. A polycarbonate plate 0.5 mm in thickness was used as the protective plate. The recording layer was formed by using the same apparatus under the same conditions as mentioned above.

While rotating the optical disk at 1800 rpm, information was repeatedly recorded and erased by applying a power-modulated laser beam to the optical disk at a line speed of 6 m/sec. As a result, the C/N ratio and the erasion ratio were found to be 50 dB and 30 dB, respectively. It was thus confirmed that the recording layer had sufficient recording and erasing characteristics.

The optical disk in which information was optically recorded under the above conditions was preserved at 30° C. and 90% RH for 300 days. Thereafter, the recorded information was reproduced. The reproduction performance was found to be almost equal to that of the optical disk right after the preparation.

EXAMPLE 5-3

A recording layer according to the present invention having a thickness of 100 nm was prepared using as the starting materials dimethyl tellurium and dimethyl germanium by the glow discharge decomposition method.

The apparatus used for the above reaction is shown in FIG. 7, in which reference numeral 7 denotes the diethyl tellurium, and an introducing line for the dimethyl germanium is omitted from this figure.

A glass plate, a silicon wafer and a polyethylene terephthalate plate were used for the substrate.

The conditions for the above reaction were as follows:

| | |
|---|---|
| Temperature of substrate: | 100° C. |
| Flow rate of Ar: | 30 SCCM |
| Flow rate of $H_2$: | 100 SCCM |
| Reaction pressure: | $1 \times 10^{-2}$ Torr |
| High-frequency power: | 100 W, 13.56 MHz |

From the analyses by FTIR and XPS and the observation by a TEM, it was confirmed that the recording layer was made of a carbon-based material in which finely-divided particles of Ge-Te having a particle size of 50 Å were dispersed.

According to an X-ray diffraction analysis, the recording layer was found to be in an amorphous phase. It was also confirmed by highly sensitive DSC and TG that the recording layer was neither decomposed nor underwent weight loss within the temperature range of 500° C. or less.

In order to evaluate the information recording and erasing characteristics of the recording layer, an optical disk composed of a substrate—a protective layer A—a recording layer—a protective layer B—an adhesive layer—a protective plate was prepared.

As the substrate, a glass plate provided with pregrooves by the 2P method was used. The protective layers A and B, each having a thickness of 100 nm, were prepared using $SiO_2$ by sputtering. An ultraviolet ray-setting resin was coated onto the protective layer B to form the adhesive layer. A glass plate 0.5 mm in thickness was used as the protective plate. The recording layer was formed by using the same apparatus under the same conditions as mentioned above.

While rotating the optical disk at 1800 rpm, information was repeatedly recorded and erased by applying a power-modulated laser beam to the optical disk at a line speed of 6 m/sec. As a result, it was found that information could be recorded in the recording layer when a laser beam with a laser power of 15 mW was applied, and the recorded information could be erased when a laser beam with a laser power of 7 mW was applied.

The optical disk in which information was optically recorded under the above conditions was preserved at 30° C. and 90% RH for 300 days. Thereafter, the recorded information was reproduced. The reproduction performance of optical disk was almost equal to that of the optical disk right after preparation.

EXAMPLE 6-1

On a substrate, a plasma-polymerized recording layer having a thickness of 100 nm was formed using copper acetylacetonate as the starting material by the glow discharge decomposition method, whereby a recording layer according to the present invention was prepared.

A glass plate, a silicon wafer, a polyethylene terephthalate plate and a polycarbonate plate were respectively used as the substrate.

Figure 8:
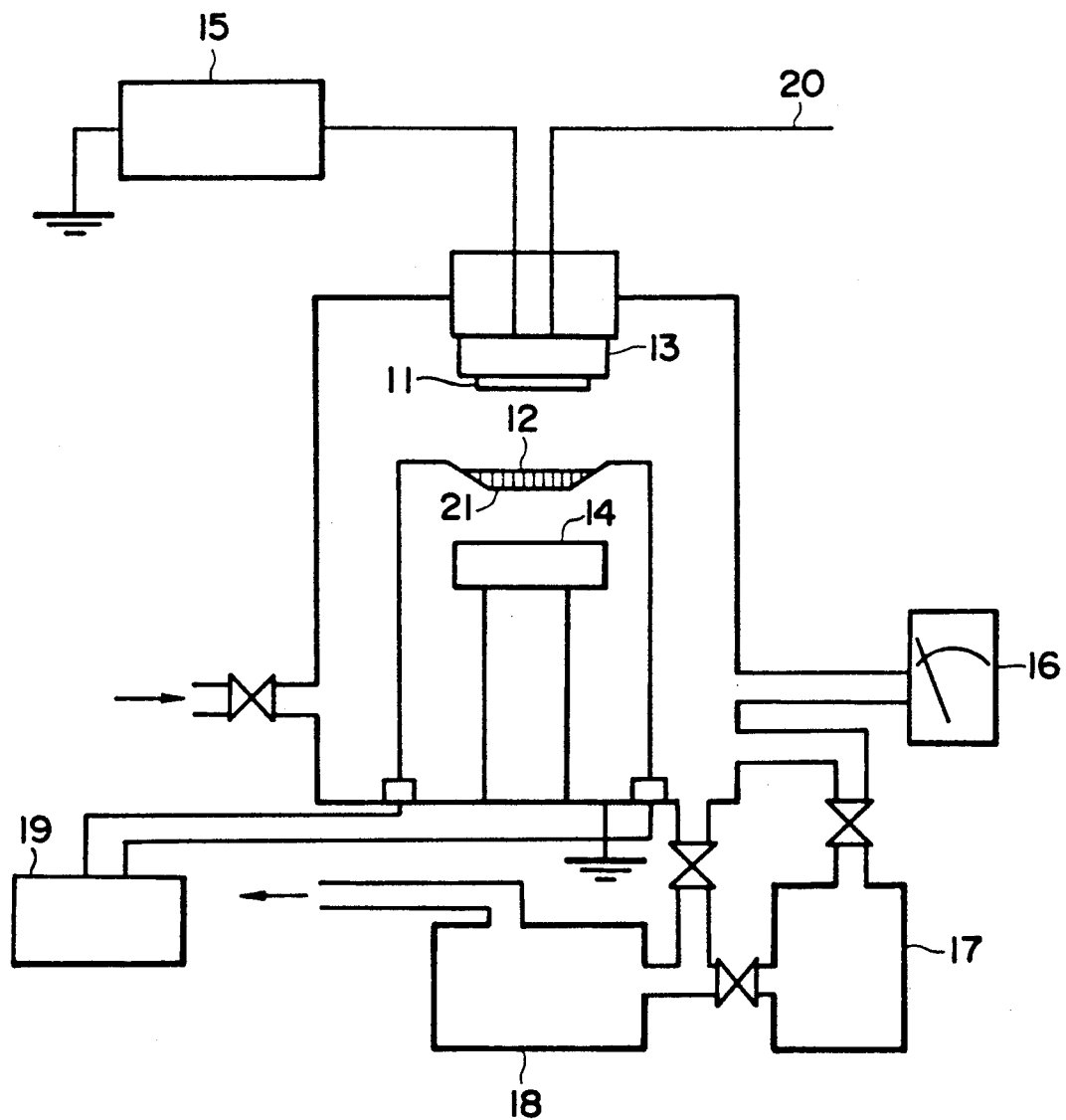
FIG. 8 is a diagram of an apparatus for plasma CVD used in Examples 6-1 to 6-4 which will be described later in this specification.

The apparatus used for the above reaction is shown in FIG. 8, in which reference numeral 11 indicates a substrate, reference numeral 12 indicates the starting material, reference numeral 13 indicates an RF electrode, reference numeral 14 indicates a counter electrode, reference numeral 15 indicates an RF power source, reference numeral 16 indicates a vacuum gauge, reference numeral 17 indicates an oil diffusion pump, reference numeral 18 indicates an oil rotary pump, reference numeral 19 indicates a controlling unit for the substrate temperature, reference numeral 20 indicates a thermocouple, and reference numeral 21 indicates an Mo heater.

The conditions for the film formation were as follows:
Temperature of substrate: 25° C.
Temperature of the starting material: 80° C.
Reaction pressure: $1 \times 10^{-2}$ Torr
High-frequency power: 70 W, 13.56 MHz The above-obtained each optical disk was analyzed by FTIR and XPS and observed by a TEM. As a result, it was found that the recording layer was a film made of a carbon-based material in which finely divided-particles of copper having a particle size of 10 nm were dispersed homogeneously.

Further, the recording layer was also subjected to the analyses by DSC and TGA. As a result, it was confirmed that the recording layer was decomposed and lost its weight within the temperature range of 250° C. or less.

In order to evaluate the information recording characteristics of the recording layer, an optical disk was prepared by forming a recording layer having a thickness of 100 nm on a polycarbonate substrate provided with pregrooves. The recording layer was formed using the same apparatus under the same conditions as described above.

While rotating the above-obtained optical disk at 1800 rpm, information was recorded by applying a laser beam to the optical disk so that a laser power of 5 mW could reach the recording layer. A reflective change was clearly confirmed between the recorded area and the non-reacorded area. The recorded area was observed by a scanning electron microscope (hereinafter referred to as SEM). As a result, it was confirmed that there existed bubbles with a smooth surface having a height of 300 nm.

The C/N ratio was found to be 55 dB. The reflectivity of the recording layer right after the preparation was 65%. The reflectivity of the recording layer was unchanged even after the preservation at 30° C. and 90% RH for 300 days.

EXAMPLE 6-2

On a substrate, a plasma-polymerized recording layer having a thickness of 100 nm was formed using nickel acetylacetonate as the starting material by the glow discharge decomposition method, whereby a recording layer according to the present invention was prepared.

A glass plate, a silicon wafer, a polyethylene terephthalate plate and a polycarbonate plate were respectively used as the substrate.

The apparatus used for the above reaction is shown in FIG. 8. The conditions for the film formation were as follows:
Temperature of substrate: 25° C.
Temperature of the starting material: 80° C.
Reaction pressure: $1 \times 10^{-2}$ Torr
High-frequency power: 70 W, 13.56 MHz The above-obtained each optical disk was analyzed by FTIR and XPS and observed by a TEM. As a result, it was found that the recording layer was a film made of a carbon-based material in which finely divided-particles of nickel having a particle size of approximately 5 nm were dispersed homogeneously.

The recording layer was also subjected to the thermal analyses by DSC and TGA. As a result, it was confirmed that the recording layer was decomposed and lost its weight within the temperature range of 250° C. or less.

In order to evaluate the information recording characteristics of the recording layer, an optical disk was prepared by forming a recording layer having a thickness of 100 nm on a polycarbonate substrate provided with pregrooves. The recording layer was formed using the same apparatus under the same conditions as described above.

While rotating the above-obtained optical disk at 1800 rpm, information was recorded by applying a laser beam to the optical disk so that a laser power of 5 mW could reach the recording layer. A reflective change between the recorded area and the non-recorded was clearly confirmed. The recorded area was observed by an SEM. As a result, it was found that there existed bubbles with a smooth surface having a height of 300 nm.

The C/N ratio was found to be 55 dB. The reflectivity of the recording layer right after the preparation was 40%. The reflectivity of the recording layer was unchanged even after the preservation at 30° C. and 90% RH for 300 days.

EXAMPLE 6-3

On a substrate, a plasma-polymerized recording layer having a thickness of 100 nm was formed using tellurium diisopropoxy diacetylacetonate as the starting material by the glow discharge decomposition method, whereby a recording layer according to the present invention was prepared.

A glass plate, a silicon wafer, a polyethylene terephthalate plate and a polycarbonate plate were respectively used as the substrate.

The apparatus used for the above reaction is shown in FIG. 8. The conditions for the film formation were as follows:

Temperature of substrate: 25° C.
Temperature of the startig material: 100° C.
Flow rate of H$_2$: 100 SCCM
Reaction pressure: $1 \times 10^{-2}$ Torr
High-frequency power: 70 W, 13,56 MHz The above-obtained each optical disk was analyzed by FTIR and XPS and observed by a TEM. As a result, it was found that the recording layer was a film made of a carbon-based material in which finely divided-particles of tellurium having a particle size of approximately 10 nm were dispersed homogeneously.

The recording layer was also subjected to the thermal analyses by DSC and TGA. As a result, it was confirmed that the recording layer was niether decomposed and nor underwent weight loss within the temperature range of 500° C. or less. The recording layer right after the formation was found to be in an amorphous phase.

In order to evaluate the information recording characteristics of the recording layer, an optical disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using Si$_3$H$_4$ by sputtering. An ultraviolet ray-setting resin was coated onto the protective layer B to form the adhesive layer. As the protective plate, a polycarbonate plate having a thickness of 0.5 mm was employed. The recording layer was formed using the same apparatus under the same conditions as mentioned above.

While rotating the above-obtained optical disk at 1800 rpm, information was repeatedly recorded and erased by applying a power-modulated laser beam to the optical disk at a line speed of 6 m/sec. As a result, the C/N ratio and the erasion ratio were found to be 50 dB and 30 dB, respectively. It was thus confirmed that the recording layer had sufficient recording and erasing characteristics.

The recording layer in which infromation was optically recorded under the above conditions was preserved at 30° C. and 90% RH for 300 days. Thereafter, the recorded information was reproduced. The reproduction performance was almost equal to that of the optical disk right after the preparation.

EXAMPLE 6-4

On a substrate, a plasma-polymerized recording layer having a thickness of 100 nm was formed using triethyl indium, selenium diisopropoxy diacetylacetonate, trimethyl thallium and cobalt(III) acetylacetonate as the starting materials by the glow discharge decomposition method, whereby a recording layer according to the present invention was prepared.

A glass plate, a silicon wafer, a polyethylene terephthalate plate and a polycarbonate plate were respectively used as the substrate.

The apparatus used for the above reaction is shown in FIG. 8, in which introducing lines for the triethyl indium, the selenium diisopropoxy diacetylacetonate and the trimethyl thallium are omitted.

The conditions for the film formation were as follows:

| Temperature of substrate: | 50° C. |
| Flow rate of Ar: | 30 SCCM |
| Flow rate of H$_2$: | 100 SCCM |
| Reaction pressure: | $1 \times 10^{-2}$ Torr |
| High-frequency power: | 100 W, 13.56 MHz |

The above-obtained each optical disk was analyzed by FTIR and XPS and observed by a TEM. As a result, it was found that the recording layer was a film made of a carbon-based material in which finely divided-particles of metals having a particle size of 5 nm were dispersed homogeneously.

According to an X-ray diffraction analysis, the recording layer right after the preparation was found to be in an amorphous phase.

The recording layer was also subjected to the thermal analyses by DSC and TGA. As a result, it was confirmed that the recording layer was neither decomposed nor underwent weight loss within the temperature range of 500° C. or less.

In order to evaluate the information recording characteristics of the recording layer, an optical disk composed of a substrate—a protective layer A—a recording layer—a protective layer B—an adhesive layer—a protective plate was prepared.

As the substrate, a polycarbonate plate provided with pregrooves was used. The protective layers A and B, each having a thickness of 100 nm, were prepared using Si$_3$H$_4$ by sputtering. An ultraviolet ray-setting resin was coated onto the protective layer B to form the adhesive layer. As the protective plate, a polycarbonate plate having a thickness of 0.5 mm was employed. The recording layer was formed using the same apparatus under the same conditions as mentioned above.

While rotating the above-obtained optical disk at 1800 rpm, information was repeatedly recorded and erased by applying a power-modulated laser beam to the optical disk at a line speed of 10 m/sec. As a result, the C/N ratio and the erasion ratio were found to be 50 dB and 30 dB, respectively. It was thus confirmed that the recording layer had sufficient recording and erasing characteristics The above recording layer in which infromation was optically recorded under the above conditions was preserved at 30° C. and 90% RH for 300 days. Thereafter, the recorded information was reproduced. The reproduction performance was almost equal to that of the optical disk right after the preparation.

EXAMPLE 7-1

In order to evaluate the information recording and erasing characteristics of an information recording medium of the present invention, an optical disk composed of a substrate—a protective layer A—a recording layer—a protective layer B—an adhesive layer—a protective plate was prepared.

Figure 9:
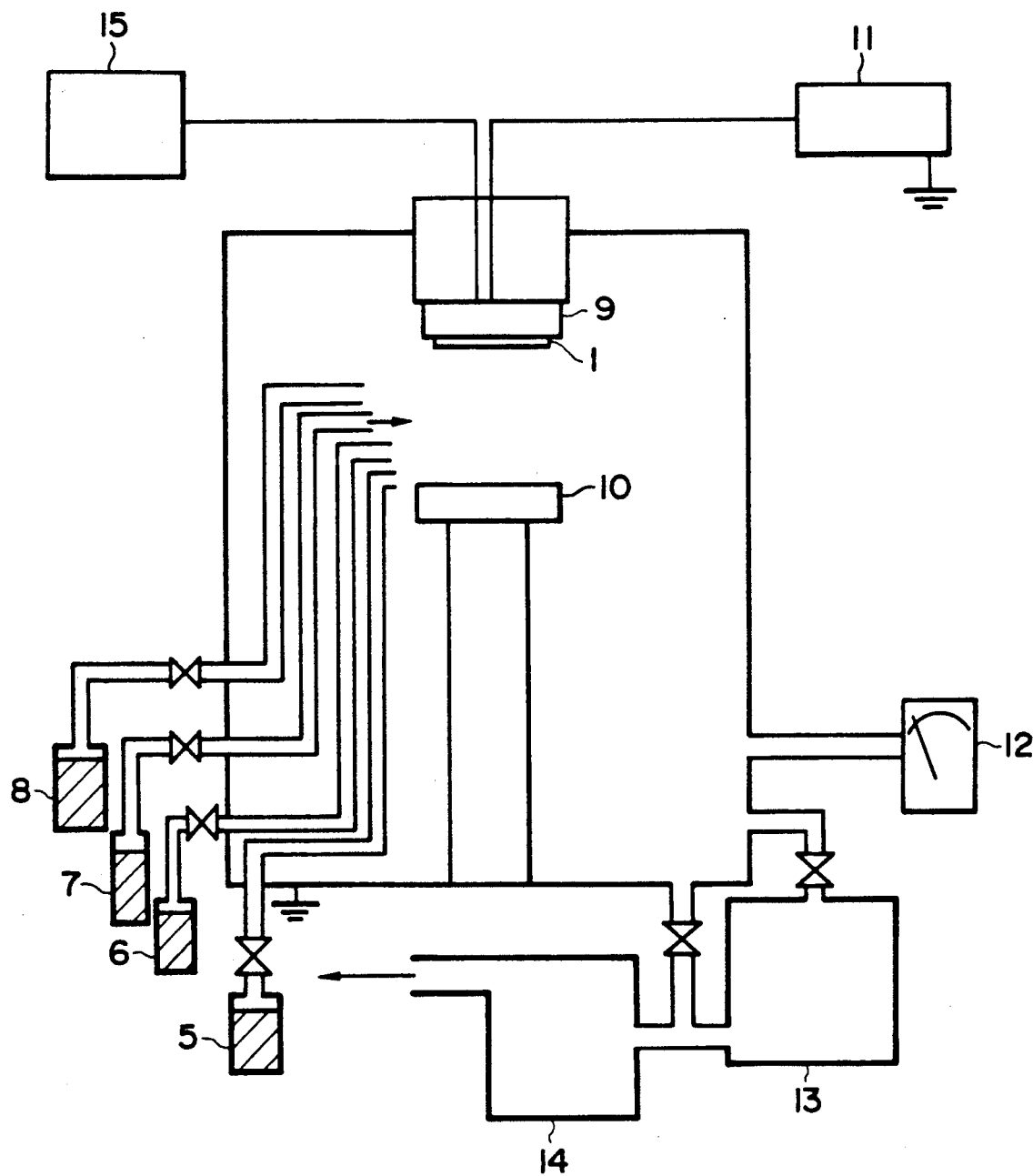
FIG. 9 is a diagram of an apparatus for plasma CVD used in Examples 7-1 to 7-3 which will be described later in this specification.

A thin film of a carbon-based material for the protective layer A was formed in the following manner using the apparatus for plasma CVD as shown in FIG. 9.

The apparatus was evacuated to $1 \times 10^{-7}$ Torr using both an oil diffusion pump 13 and an oil rotary pump 14. Then, methane gas was introduced into the apparatus from a cylinder 5 at a flow rate of 5 SCCM, and H$_2$ gas was introduced from a cylinder 6 at a flow rate of 100

SCCM. The pressure inside the apparatus was thus adjusted to $1\times 10^{-2}$ Torr. Thereafter, plasma was generated by applying an electric power of 50 W, whereby a film, serving as a protective layer, having a thickness of 100 nm was formed on a polycarbonate substrate 1 having a diameter of 85 mm provided with pregrooves, arranged on an RF electrode 9.

The recording layer was formed on the above-obtained protective layer A in the following manner.

The apparatus was evacuated to $1\times 10^{-7}$ Torr, to which diphenyl tellurium was introduced from a cylinder 7 heated to 65° C., $H_2$ gas was introduced from the cylinder 6 at a flow rate of 100 SCCM, and Ar gas was introduced from a cylinder 8 at a flow rate of 10 SCCM. The pressure inside the apparatus was thus adjusted to $1\times 10^{-2}$ Torr. Thereafter, plasma was generated by applying an electric power of 50 W, whereby a film, serving as a recording layer, having a thickness of 100 nm was formed on the protective layer A.

It was found that the obtained recording layer was made of a highly cross-linked carbon-based material in which finely-divided particles of tellurium having a particle size of approximately 50 Å were dispersed.

The protective layer B was formed in the same manner as for the formation of the protective layer A.

An ultraviolet ray-setting resin was coated onto the protective layer B to form the adhesive layer.

A polycarbonate plate having a thickness of 0.5 mm was employed as the protective plate.

When preparing the optical disk, the protective layer A formed on the glass substrate was analyzed by highly sensitive DSC and TGA. As a result, the protective layer A was neither decomposed nor underwent weight loss within the temperature range of 600° C. or less.

While rotating the above-obtained optical disk at 900 rpm, information was repeatedly recorded and erased by applying a power-modulated laser beam to the disk at a line speed of 6 m/sec. As a result, the C/N ratio and the erasion ratio were found to be 50 dB and 30 dB, respectively. It was thus confirmed that the recording layer had sufficient recording and erasing characteristics.

EXAMPLE 7-2

Example 7-1 was repeated except that the methane used in Example 7-1 for preparing the protective layer A was replaced by styrene, whereby an information recording medium according to the present invention was prepared.

The above-obtained recording medium was evaluated in the same manner as in Example 7-1. As a result, it was confirmed that the recording medium had almost the equal characteristics to those of the recording medium prepared in Example 7-1.

EXAMPLE 7-3

Example 7-1 was repeated except that the recording layer formed in Example 7-1 was replaced by an AgInTe$_2$ film prepared by sputtering, whereby an information recording medium according to the present invention wa prepared.

The above-obtained recording medium was evaluated in the same manner as in Example 7-1. As a result, it was confirmed that the recording medium had almost the equal characteristics to those of the recording medium prepared in Example 7-1.

EXAMPLE 8-1

In order to evaluate the information recording and erasing characteristics of an information recording medium of the present invention, an optical disk composed of a substrate—a protective layer—a recording layer—a heat-radiation layer—an adhesive layer—a protective plate was prepared.

Figure 10:
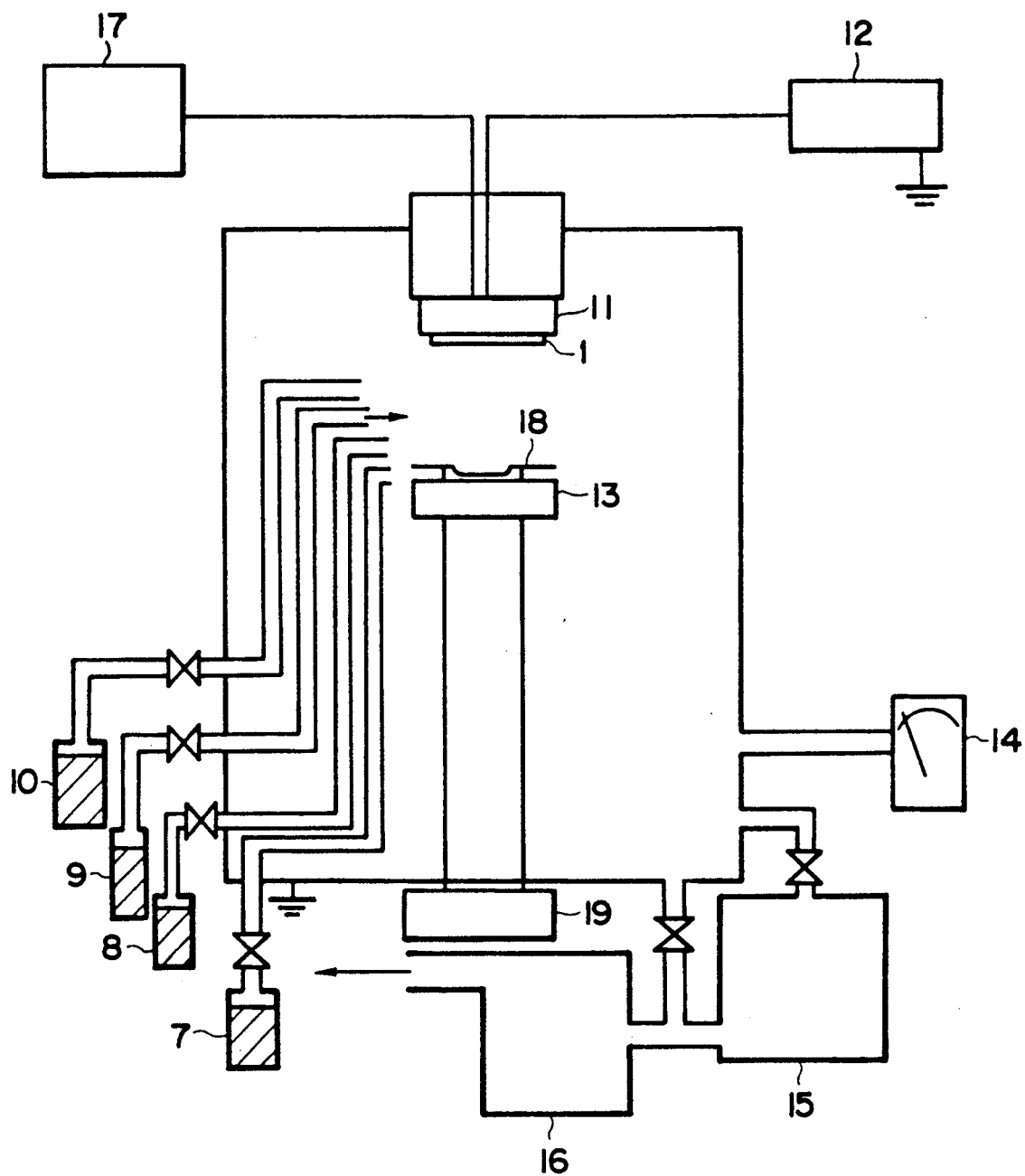
FIG. 10 is a diagram of an apparatus for plasma CVD used in Examples 8-1 and 8-2 which will be described later in this specification.

The protective layer A was formed in the following manner using the apparatus for plasma CVD as shown in FIG. 10.

The apparatus was evacuated to $1\times 10^{-7}$ Torr using both an oil diffusion pump 15 and an oil rotary pump 16. Then, methane gas was introduced into the apparatus from a cylinder 7 at a flow rate of 5 SCCM, and $H_2$ gas was introduced from a cylinder 8 at a flow rate of 100 SCCM. The pressure inside the apparatus was thus adjusted to $1\times 10^{-2}$ Torr. Thereafter, plasma was generated by applying an electric power of 50 W, whereby a film, serving as the protective layer A, having a thickness of 100 nm was formed on a polycarbonate substrate 1 having a diameter of 85 mm provided with pregrooves, arranged on an RF electrode 11.

The recording layer was formed on the above-obtained protective layer A in the following manner.

The apparatus was evacuated to $1\times 10^{-7}$ Torr, to which diphenyl tellurium was introduced from a cylinder 9 heated to 65° C., $H_2$ gas was introduced from the cylinder 8 at a flow rate of 100 SCCM, and Ar gas was introduced from a cylinder 10 at a flow rate of 10 SCCM. The pressure inside the apparatus was thus adjusted to $1\times 10^{-2}$ Torr. Thereafter, plasma was generated by applying an electric power of 50 W, whereby a film, serving as a recording layer, having a thickness of 100 nm was formed on the protective layer A.

It was found that the obtained recording layer was made of a highly cross-linked carbon-based material in which finely-divided particles of tellurium having a particle size of approximately 50 Å were dispersed.

The heat-radiation layer was formed on the recording layer obtained above in the following manner.

When synthesizing a carbon-based material, Ag was vaporized from an Mo heater 18. The resulting layer was made of the carbon-based material in which the Ag particles were dispersed. The ratio of Ag to C was controlled to 50:50.

An ultraviolet ray-setting resin was coated onto the heat-radiation layer to form the adhesive layer.

A polycarbonate plate having a thickness of 0.5 mm was employed as the protective plate.

When preparing the optical disk, the heat-radiation layer formed on the recording layer was analyzed by highly sensitive DSC and TGA. As a result, the heat-radiation layer was neither decomposed nor underwent weight loss within the temperature range of 600° C. or less.

Information was repeatedly recorded and erased by applying a power-modulated laser beam to the disk at a line speed of 11 m/sec. As a result, the C/N ratio and the erasion ratio were found to be 50 dB and 30 dB, respectively. It was thus confirmed that the recording layer had sufficient recording and erasing characteristics.

EXAMPLE 8-2

Example 8-1 was repeated except that the recording layer formed in Example 8-1 was replaced by an AgInTe$_2$ film with 80 nm in thickness prepared by sputtering and the heat-radiation layer formed in Example 8-1 was replaced by an Al-C film with an Al:C ratio of 70:30, whereby an information recording medium according to the present invention was parepared.

Information was repeatedly recorded and erased by applying a power-modulated laser beam to the optical disk at a line speed of 11 m/sec. As a result, the C/N ratio and the erasion ratio were found to be 53 dB and −30 dB, respectively. It was thus confirmed that the recording layer had sufficient recording and erasing characteristics.

The information recording medium according to the present invention comprises an optically reversible material whose matrix is made of a carbon-based material, especially a plasma polymerized film of a pigment or $CH_3Cl$. Such a matrix is highly cross-linked, nonvolatile amorphous material, so that it is not crystallized even when information was repeatedly recorded and erased. Therefore, the C/N ratio and the erasion ratio are not lowered after the repeated recording and erasing. Further, the matrix has low thermal conductivity, so that improved recording sensitivity can be obtained.

The matrix, a plasma-polymerized film, surrounds the optically reversible material, so that the recording layer itself has sufficient mechanical strength, heat resistance, weather resistance and corrosion resistance, and has the prolonged expected life span.

Use of finely-divided particles of a light absorptive material brings about the following advantages:

(1) The sensitivity is enhanced because energy of the electromagnetic waves applied to the recording layer for information recording and erasing is concentrated to the finely-divided particles.

(2) The erasion ratio becomes large because the size of the crystal at the time of erasion cannot be larger than that of the finely-divided particles.

When the recording layer is prepared by subjecting an organometallic compound or an organometallic complex to the glow discharge decomposition method, the particle size and the size distribution of finely-divided particles of a light-absorptive material can be easily controlled. Therefore, the characteristics of the recording layer such as recording sensitivity, erasing sensitivity and the expected life span can be controlled as desired.

When the recording layer is provided with a protective layer made of a carbon-based material, the protective layer is neither crystallized nor reacted with the recording layer when information was repeatedly recorded and erased. The recorded information can thus be stored for a long time. Moreover, scince both the protectice layer and the recording layer are made of a carbon-based material, adhesion between these two layers are high. For this reason, these layers do not peel off each other when heat is applied thereto, and the recorded information can be stored for a prolonged period of time.

Furthermore, the information recording medium of the present invention can be provided with a heat-radiation layer made of a carbon-based material in which finely-divided particles of a metal are dispersed. Such metallic particles contribute to control the thermal conductivity of the heat-radiation layer. Therefore, optimum speed and sensitivity for information recording and erasing can be readily obtained. In addition, no chemical reaction between the heat-radiation layer and the recording layer is caused, so that the recorded information can be stored for a prolonged period of time. Since both the heat-radiation layer and the recording layer are made of a carbon-based material, adhesion between these two layers is high. Peeling off between these two layer can thus be prevented, and the life of the recorded information can be prolonged.

Finally, the carbon-based material containing finely-divided particles of a metal can not only radiate heat but also reflect heat. Therefore, the recording and erasing sensitivities can be improved.

What is claimed is:

1. An information recording medium capable of recording information reversibly with application of electromagnetic waves with different powers or wavelengths, comprising a substrate, and a recording layer formed thereon which comprises (a) a carbon-based material and (b) an optically reversible material whose optical characteristics can be reversibly changed, with the thermal decomposition temperature of said carbon-based material being higher than the melting point of said optically reversible material, wherein said carbon-based material is a polymer prepared by subjecting a pigment to plasma polymerization.

2. The information recording medium as claimed in claim 1, wherein said pigment is a phthalocyanine-type pigment.

3. The information recording medium as claimed in claim 1, wherein said pigment is a quinacridone-type pigment.

* * * * *